United States Patent [19]
Torii et al.

[11] Patent Number: 5,791,204
[45] Date of Patent: Aug. 11, 1998

[54] DEVICE FOR DETECTING THE POSITION OF A MOVING MEMBER

[75] Inventors: Katsuhiko Torii; Kengo Yamamura; Mitsuhiro Ikeya, all of Shizuoka-ken, Japan

[73] Assignee: Asmo Co., Ltd., Shizuoka-ken, Japan

[21] Appl. No.: 592,517

[22] Filed: Jan. 26, 1996

[30] Foreign Application Priority Data

Jan. 27, 1995 [JP] Japan .................................. 7-011948

[51] Int. Cl.$^6$ .................................................. F16H 57/02
[52] U.S. Cl. .................... 74/606 R; 74/83.11; 74/83.13; 475/342; 49/334; 296/223
[58] Field of Search .................. 74/89.13, 606 R, 74/575, 42; 49/334, 340, 324, 218, 280, 360, 28; 475/342; 296/223

[56] References Cited

U.S. PATENT DOCUMENTS

| | | | |
|---|---|---|---|
| 3,422,704 | 1/1969 | Catlett | 74/801 |
| 3,980,846 | 9/1976 | Yoshida . | |
| 4,468,063 | 8/1984 | Yukimoto et al. | 74/804 X |
| 4,561,691 | 12/1985 | Kawai et al. | 49/28 |
| 4,599,824 | 7/1986 | Mitsuhashi et al. | 49/334 X |
| 4,625,328 | 11/1986 | Carli | 49/28 |
| 4,659,141 | 4/1987 | Masuda et al. . | |
| 4,920,784 | 5/1990 | Gonsior . | |
| 5,221,239 | 6/1993 | Catlett | 475/342 |
| 5,271,182 | 12/1993 | Greisner et al. | 49/325 |
| 5,386,885 | 2/1995 | Bunzl et al. | 74/89.13 |

FOREIGN PATENT DOCUMENTS

| | | |
|---|---|---|
| B-359853 | 3/1990 | European Pat. Off. . |
| A-3838285 | 5/1990 | Germany . |
| 59-148586 | 8/1984 | Japan . |
| 2-190587 | 7/1990 | Japan . |
| 5-211747 | 8/1993 | Japan . |
| 5-84773 | 11/1993 | Japan . |

*Primary Examiner*—Viinh T. Luong
*Attorney, Agent, or Firm*—Hazel & Thomas, P.C.

[57] ABSTRACT

A position detecting device includes a ring gear that is disposed on an outer side of an output shaft of a motor and rotates with the rotation of the output shaft, fixed contact terminals fixed to a cover plate, and a rotary contact terminal provided on a ring gear. As the ring gear rotates, the fixed contact terminals and the rotary contact terminal are brought into contact with each other, thereby detecting a rotational position of the output shaft. The position detecting device further includes a clutch mechanism for preventing the rotation of the ring gear by more than a predetermined degree while permitting the rotation of the output shaft of the motor in the state of contact. Hence, even if the output shaft of the motor is rotated sufficiently, this state of contact is maintained.

25 Claims, 23 Drawing Sheets

F I G. 9
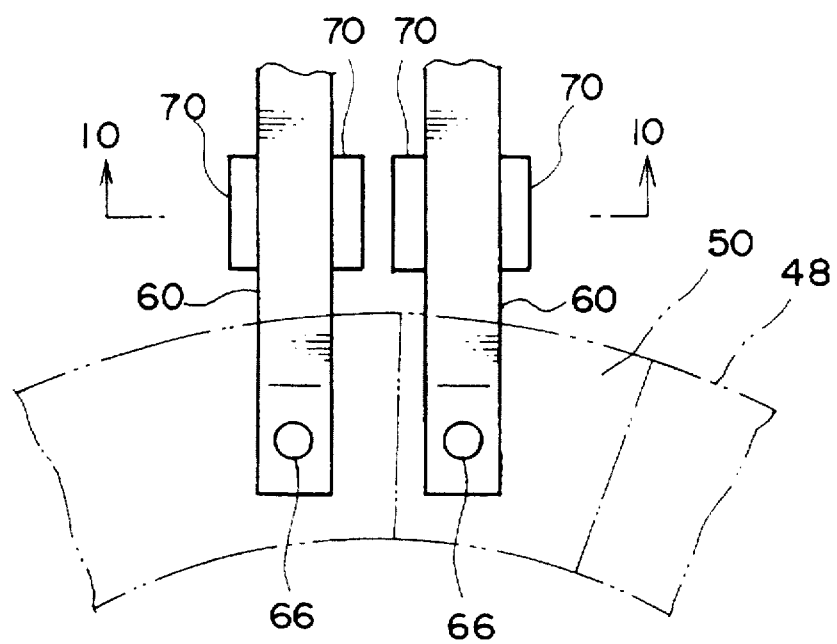
F I G. 10
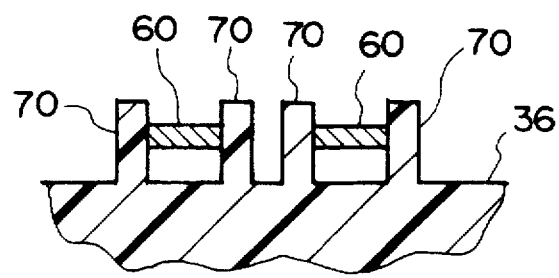

F I G. 23
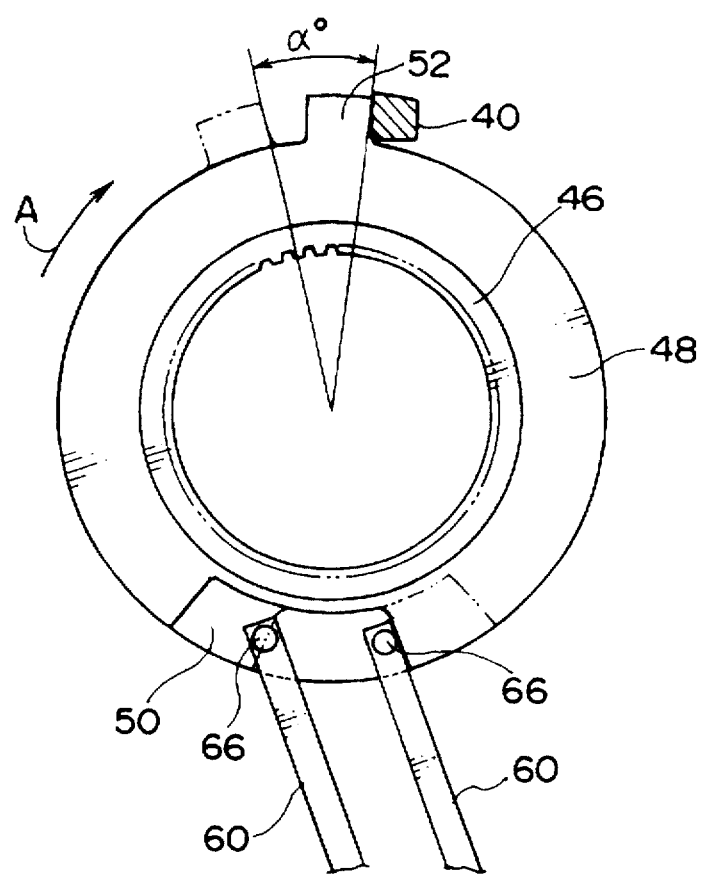

F I G. 2 4
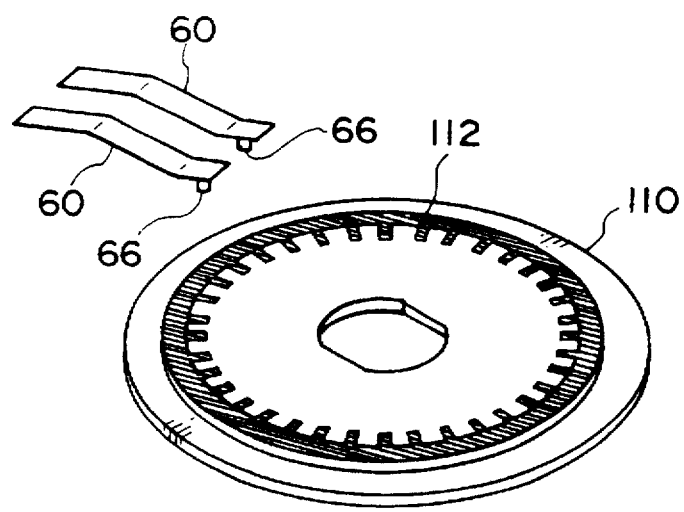

DEVICE FOR DETECTING THE POSITION OF A MOVING MEMBER

BACKGROUND OF THE INVENTION

1. Field of the Invention

The present invention relates to a device for detecting the position of a moving member which is used for a power window apparatus for moving the window glass of a vehicle door to open or close it, a sun roof apparatus for moving a sun roof to open or close it, and the like.

2. Description of the Related Art

A motor is used as a driving source in a power window apparatus for vertically moving the window glass of a vehicle to open and close it and a sun roof apparatus for moving a sun roof to open or close it.

In power window apparatuses, for instance, there is a type which is provided with the so-called catching-preventing function of preventing a part of the body of a vehicle occupant or a foreign object from becoming unnecessarily caught by the window glass. Among the power window apparatuses having this type of catching-preventing function, there is an apparatus arranged such that a limit switch is disposed at a predetermined position in a door, and a determination is made as to whether a foreign object has been caught by the window glass on the basis of a signal from the limit switch and a lock current from a motor so as to control the movement of the window glass, i.e., the rotational position of the motor, and there is an apparatus arranged such that a Hall IC and a special commutator are provided to detect the number of revolutions of an armature, and a determination is made as to whether a foreign object has been caught by the window glass on the basis of a number-of-revolutions detection signal (the number of pulses and the pulse width of a pulse signal) so as to control the rotational position of the motor.

With such conventional power window apparatuses (mechanisms for detecting the rotational position of a motor), there has been a drawback in that when a motor and a window regulator are installed, the complicated adjustment of an installing position during the installation and the complicated resetting after the installation are indispensable. Further, since the arrangement provided is such that various units making up the mechanism are disposed at different positions and are connected to each other by lead wires or the like (e.g., an arrangement in which a limit switch is disposed in a door, a control device is disposed on the vehicle body side, and the limit switch, the control device, and the motor are connected to each other by lead wires or the like), the assembling work is troublesome, a large installation space is required, and the manufacturing cost is high.

SUMMARY OF THE INVENTION

In view of the above-described circumstances, it is an object of the present invention to provide a device for detecting the position of a moving member which, when used for a power window apparatus or a sun roof apparatus, is capable of detecting the position of the window glass or the sun roof with high accuracy, which makes it possible to set an initial position without involving complicated adjustment, and which has a simple and compact structure to improve the assembling efficiency, and can be realized at low cost.

In accordance with a first aspect of the present invention, there is provided a device for detecting the position of a moving member for detecting a predetermined position of movement of a moving member which moves in a forward direction and a reverse direction, the device comprising: a switch portion accommodated integrally in a case and having at least one pair of resilient contact terminals which are turned on and off; a planetary gear train having a ring gear and a planetary gear which are accommodated integrally in the case, the planetary gear train being interlocked with the moving member by a moving force transmitted from the moving member, the ring gear being adapted to operate the switch portion when the moving member is located at the predetermined position; a clutch mechanism which is accommodated integrally in the case and is normally adapted to transmit the moving force of the moving member from the planetary gear to the ring gear by preventing the revolution of the planetary gear to rotate the ring gear, the clutch mechanism being adapted to interrupt the transmission of a rotating force in the forward direction from the moving member to the ring gear by permitting the revolution of the planetary gear in a state in which the switch portion is operated; and a control circuit accommodated integrally in the case and connected to the switch portion so as to detect the predetermined position of movement of the moving member as the switch portion is turned on or off.

In accordance with a second aspect of the present invention, in the device for detecting the position of a moving member according to the first aspect of the invention, the case includes a cover plate and a base plate which are fitted to each other, passing/nipping portions each having a series of concave and convex portions corresponding to lead wires for connecting the control circuit to an external device are respectively provided in the cover plate and the base plate, the lead wires are nipped by the passing/nipping portions in close contact therewith and are led to an outside, and an insulating resin material is filled in an interior portion of the case accommodating the lead wires.

In accordance with a third aspect of the present invention, in the device for detecting the position of a moving member according to the second aspect of the invention, a retaining pawl which engages the base plate is provided on the cover plate, and the cover plate and the base plate are integrally fixed to each other by means of the retaining pawl.

In accordance with a fourth aspect of the present invention, in the device for detecting the position of a moving member according to any one of the first to third aspects of the invention, one end of each of the contact terminals of the switch portion is supported by being directly fixed to the case.

In accordance with a fifth aspect of the present invention, in the device for detecting the position of a moving member according to the fourth aspect of the invention, guide walls respectively corresponding to transversely opposite ends of each of the contact terminals to prevent the positional offset of the contact terminal are provided integrally on the case.

In accordance with a sixth aspect of the present invention, in the device for detecting the position of a moving member according to the fifth aspect of the invention, the guide walls are respectively provided at positions corresponding to the transversely opposite ends of the contact terminal in a natural state of each of the contact terminals fixed to the case.

In accordance with a seventh aspect of the present invention, in the device for detecting the position of a moving member according to any one of the first to sixth aspects of the invention, a distal-end sliding portion of each of the contact terminals of the switch portion is formed as a cylindrical portion, and the cylindrical portion is brought into planar contact with a corresponding contact.

In accordance with an eighth aspect of the present invention, in the device for detecting the position of a moving member according to any one of the first to seventh aspects of the invention, a press-in contact portion which is pressure-fitted to another corresponding terminal is provided at a distal-end connecting portion of a power supplying connection terminal connected to the control circuit, and a groove for soldered connection is provided in a vicinity of the press-in contact portion.

With the device for detecting the position of a moving member according to the first aspect of the invention, the revolution of the planetary gear is normally prevented by the clutch mechanism, and when the moving member moves in the forward or reverse direction, the moving force is transmitted to the planetary gear and the ring gear, so that the ring gear is rotated in interlocking relation to the moving member. When the moving member reaches a predetermined position of movement, the switch portion is operated by the ring gear, thereby detecting the predetermined position of movement of the moving member.

Meanwhile, in a state in which the switch portion is operated, the revolution of the planetary gear is allowed by the clutch mechanism, so that the transmission of the rotating force in the forward direction from the moving member to the ring gear is interrupted. That is, once the switch portion is operated, even if the moving member moves in the forward direction, the ring gear of the planetary gear train does not move, and the state of operation of the switch portion is maintained. In other words, as the moving member is temporarily moved sufficiently in the forward direction, the device for detecting the position of a moving member can be automatically set in the initial state in which the switch portion is operated.

Accordingly, if this position detecting device is used, for example, for a power window apparatus for a vehicle having the catching-preventing function and for a driving motor thereof, when the position detecting device is installed in a vehicle body, if the output shaft of the motor is temporarily rotated sufficiently in the forward direction, the position detecting device is automatically set in the initial state in which the switch portion is operated. Thus, the setting of the initial position can be effected easily without involving the complicated adjustment of an installing position during installation and the complicated resetting after installation.

Further, in the apparatus arranged such that the number of revolutions of an armature of a motor for driving the power window apparatus is detected by using a Hall IC and the like to detect the rotational position of a rotating shaft of the motor, i.e., the position of movement of the window glass, a counter is indispensable in its control circuit. With the position detecting device in accordance with the present invention, the position can be accurately detected by a single on/off signal, and the counter is not required for the control circuit, so that the manufacturing cost can be lowered.

Furthermore, with the device for detecting the position of a moving member according to the first aspect of the invention, since the control circuit for detecting the position of movement of the moving member in association with the switch portion is accommodated integrally in the case, the device as a whole can be made compact. Accordingly, in a case where the position detecting device is used for a power window apparatus for a vehicle and for a driving motor thereof, a large installation space is not required, and the installation work is facilitated. Moreover, lead wires and the like which are conventionally used for connecting various component parts are not required, thereby making it possible to reduce the manufacturing cost substantially.

With the device for detecting the position of a moving member according to the second aspect of the invention, the lead wires of the control circuit are nipped by the passing/nipping portions provided in the cover plate and the base plate, and are led outside the case. Here, the passing/nipping portions are formed with a series of concave and convex portions corresponding to the lead wires, and the lead wires are nipped in close contact with the passing/nipping portions. Hence, when an insulating resin material is filled in an interior portion of the case for accommodating the lead wires, the insulating resin material which is filled is prevented from flowing out of the case. In addition, in the event that an external force is applied to the lead wires, since the lead wires are nipped by the passing/nipping portions, the external force is not transmitted to the connecting portion between the control circuit and the lead wires. Hence, faulty connection between the control circuit and the lead wires can be prevented.

With the device for detecting the position of a moving member according to the third aspect of the invention, the retaining pawl provided on the cover plate engages the base plate, so that the cover plate is integrally fixed to the base plate with a simple snapping operation. Accordingly, the assembling operation improves substantially. Further, if the retaining pawls are provided at a plurality of portions, the cover plate and the base plate can be fixed to each other more reliably, and the sealing characteristic also improves.

With the device for detecting the position of a moving member according to the fourth aspect of the invention, one end of each of the contact terminals of the switch portion which is accommodated in the case is supported by being directly fixed to the case. In other words, as the contact terminals are secured to the case, the contact terminals are set in a state of being covered by the case. Accordingly, it is possible to reduce the possibility of the contact terminals being unnecessarily brought into contact with other members or becoming positionally offset during the assembling and transit of the component parts, and the contact terminals can be fixed reliably in a predetermined position.

With the device for detecting the position of a moving member according to the fifth aspect of the invention, the transversely opposite ends of each of the contact terminals which are supported by being fixed directly to the case are guided by the guide walls provided integrally on the case. Accordingly, even in a case where the overall length of each of the contact terminals is formed to be long, the contact terminals are prevented from being swayed unnecessarily and becoming positionally offset, and the detection accuracy of the contact terminals, i.e., the switch portion, is prevented from declining.

With the device for detecting the position of a moving member according to the sixth aspect of the invention, in the state in which the contact terminals are secured to the case (in the state in which the contact terminals are set on the case), i.e., in the natural state in which the contact terminals have not been resiliently deformed, the guide walls correspond to the transversely opposite ends of each contact terminal, and are capable of guiding the same. Accordingly, when the contact terminals are subsequently assembled together with the case, it is possible to prevent a situation in which the contact terminals are unnecessarily engaged with the guide walls to prize the contact terminals, so that the contact terminals can be assembled reliably in a predetermined position.

With the device for detecting the position of a moving member according to the seventh aspect of the invention, the distal-end sliding portion of each of the contact terminals is formed as a cylindrical portion, and the cylindrical portion is brought into planar contact with a corresponding contact. Therefore, even if the distal-end sliding contact of each of the contact terminals is worn due to sliding over long periods of time, the initial state of contact is maintained, so that the detection accuracy of the contact terminals, i.e., the switch portion, does not decline. Accordingly, if the arrangement provided is such that a pulse signal is detected by the contact terminals, the duty of the pulse signal can be advantageously maintained reliably at a fixed level.

With the device for detecting the position of a moving member according to the eighth aspect of the invention, the press-in contact portion is provided at a distal-end connecting portion of the power-supplying connection terminal connected to the control circuit, and the press-in contact portion is pressure-fitted to another terminal and is connected thereto. For this reason, the assembling efficiency improves. Further, the press-in contact portion is secured as solder is allowed to flow through the solder groove provided in the vicinity of the press-in contact portion. Hence, the influx efficiency of solder improves, with the result that the power-supplying wiring terminal can be easily and reliably connected and secured.

The above and other objects, features and advantages of the present invention will become more apparent from the following detailed description of the invention when read in conjunction with the accompanying drawings.

BRIEF DESCRIPTION OF THE DRAWINGS

FIG. 9 is a plan view illustrating the relationship between the contact terminal and guide walls of the position detecting device in accordance with the embodiment of the present invention;

FIG. 10 is a cross-sectional view taken along line 10—10 in FIG. 9, and illustrates the relationship between the contact terminal and guide walls of the position detecting device in accordance with the embodiment of the present invention;

FIG. 23 is a plan view illustrating the relationship of correspondence among the contact terminals, a contact plate, and a stopper portion of the position detecting device in accordance with the embodiment of the present invention;

FIG. 24 is a perspective view illustrating another example of use of the contact terminals of the position detecting device in accordance with the embodiment of the present invention;

DESCRIPTION OF THE PREFERRED EMBODIMENT

Figure 2:
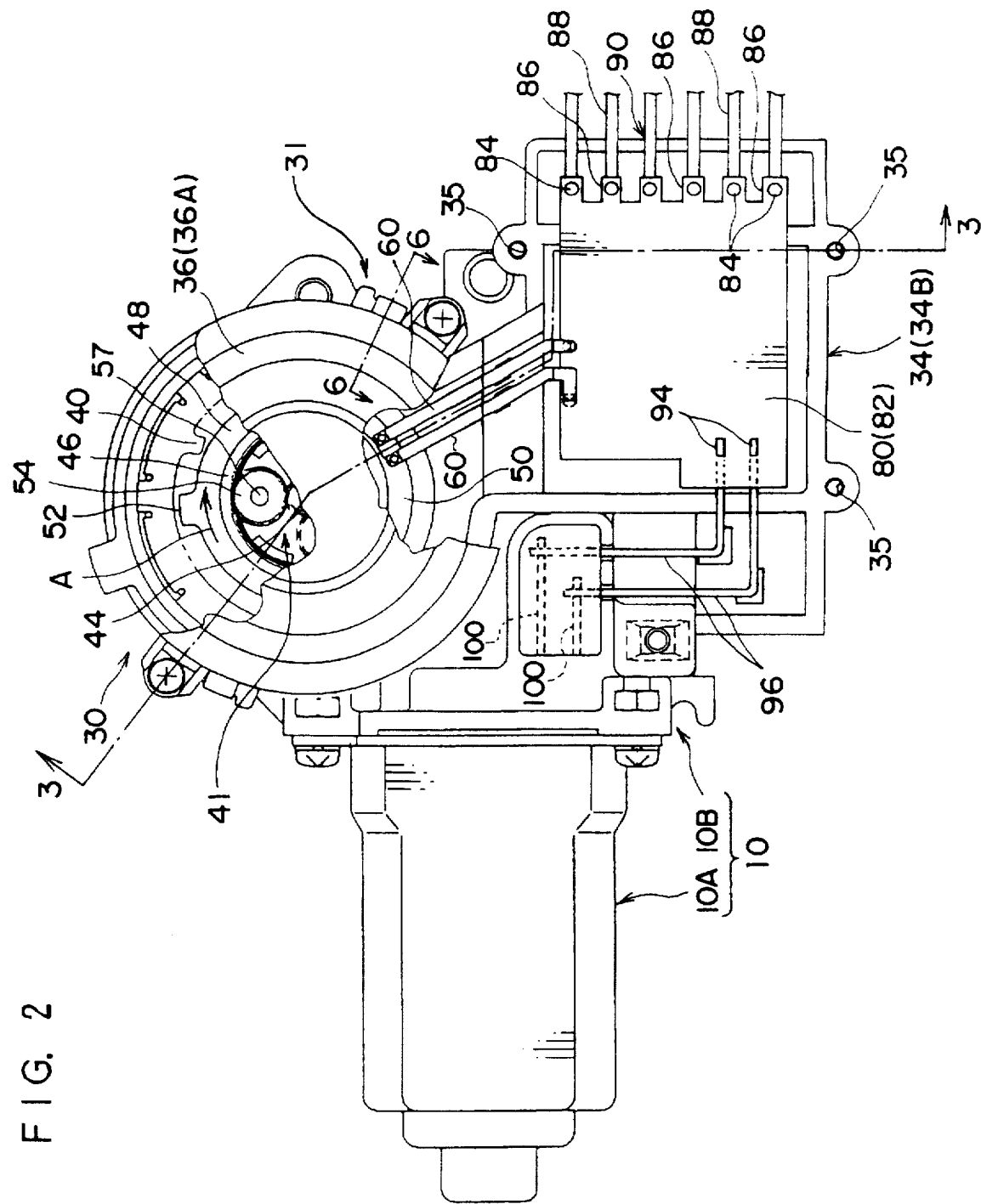
FIG. 2 is a fragmentary plan view of the position detecting device in accordance with the embodiment of the present invention and a motor for a power window apparatus to which the position detecting device is applied.
Figure 3:
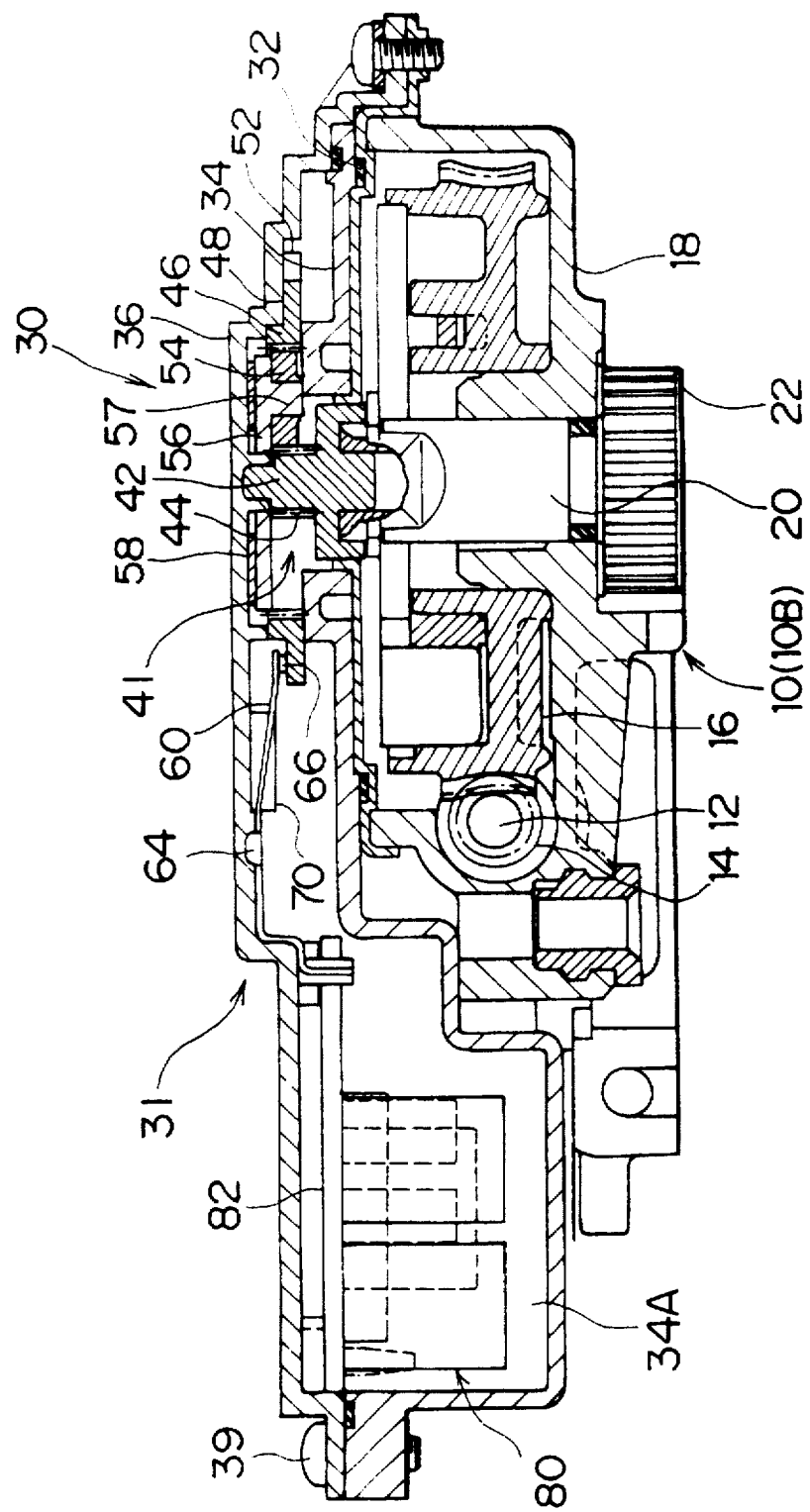
FIG. 3 is a cross-sectional view of the position detecting device in accordance with the embodiment of the present invention and the motor for the power window apparatus to which the position detecting device is applied.
Figure 29:
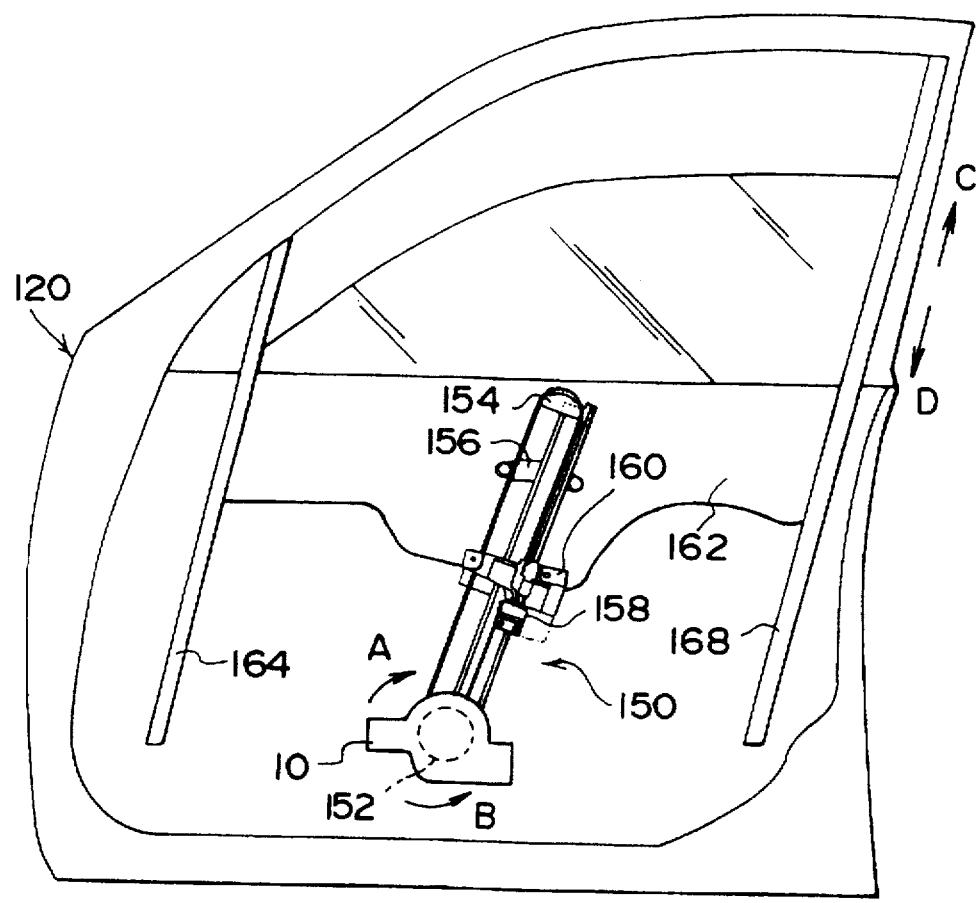
FIG. 29 is a schematic diagram of the power window apparatus to which the position detecting device of the present invention is applied.

FIG. 2 is a fragmentary plan view of a motor 10 of a power window apparatus to which a position detecting device 30 in accordance with an embodiment of the present invention is applied. FIG. 3 is a cross-sectional view of the motor 10 and the position detecting device 30. FIG. 29 is a schematic diagram of a power window apparatus 150.

Referring to FIG. 29, a brief description will be given of the power window apparatus 150. The power window apparatus 150, which is disposed in a door 120 of an automobile, is provided with the motor 10 having the position detecting device 30. When the motor 10 is driven, the rotation of the motor 10 is transmitted to a sprocket 152 by means of a reduction gear (not shown), which in turn causes a belt member 156 wound around the sprocket 152 and a guide member 154 to rotate. Further, as a carrier plate 160 connected to the belt member 156 by means a slider 158 moves, window glass 162 fixedly supported by the carrier plate 160 is lifted up or in the direction C" down in the direction D while being guided by a pair of guide frames 164 and 168. A further description of the power window apparatus 150 will be omitted.

As shown in FIG. 2, the motor 10 is comprised of a motor section 10A and a gear section 10B connected to the motor section 10A. A rotating shaft 12 of the motor section 10A extends into the gear section 10B, and a worm gear 14 is formed at a distal end thereof, as shown in FIG. 3. The worm gear 14 meshes with a rotating gear wheel 16 disposed in the gear section 10B.

A shaft 20 of the rotating gear wheel 16, which serves as a motor output shaft or (moving member), is rotatably supported in a cover 18 of the gear section 10B. Consequently, when the motor section 10A is actuated and the rotating shaft 12 rotates, its rotating force is transmitted to the rotating gear wheel 16 by means of the worm gear 14, thereby rotating the moving member or shaft 20. A pinion 22 is attached to a distal end of the shaft 20, and meshes with a rack (not shown) of a window regulator. In this embodiment, a setting is provided such that the window glass moves by one stroke as the moving member or shaft 20 via (pinion 22) undergoes, for instance, three to 3.5 revolutions.

Meanwhile, the position detecting device 30 is attached by means of a gasket 32 to a surface of the rotating gear wheel 16 which is away from the surface thereof where the pinion 22 is disposed.

Figure 1:
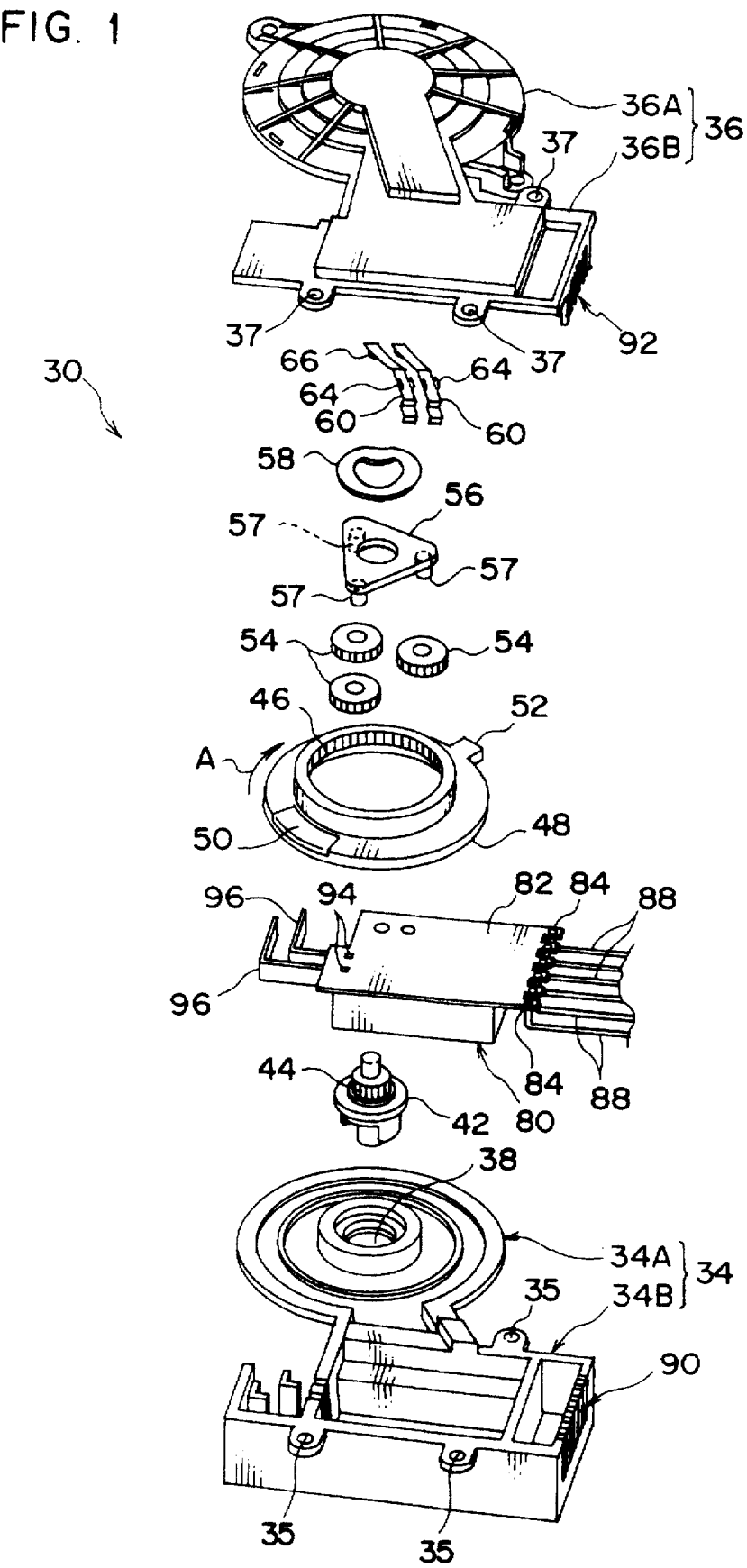
FIG. 1 is an exploded perspective view of a position detecting device in accordance with an embodiment of the present invention.
Figure 4:
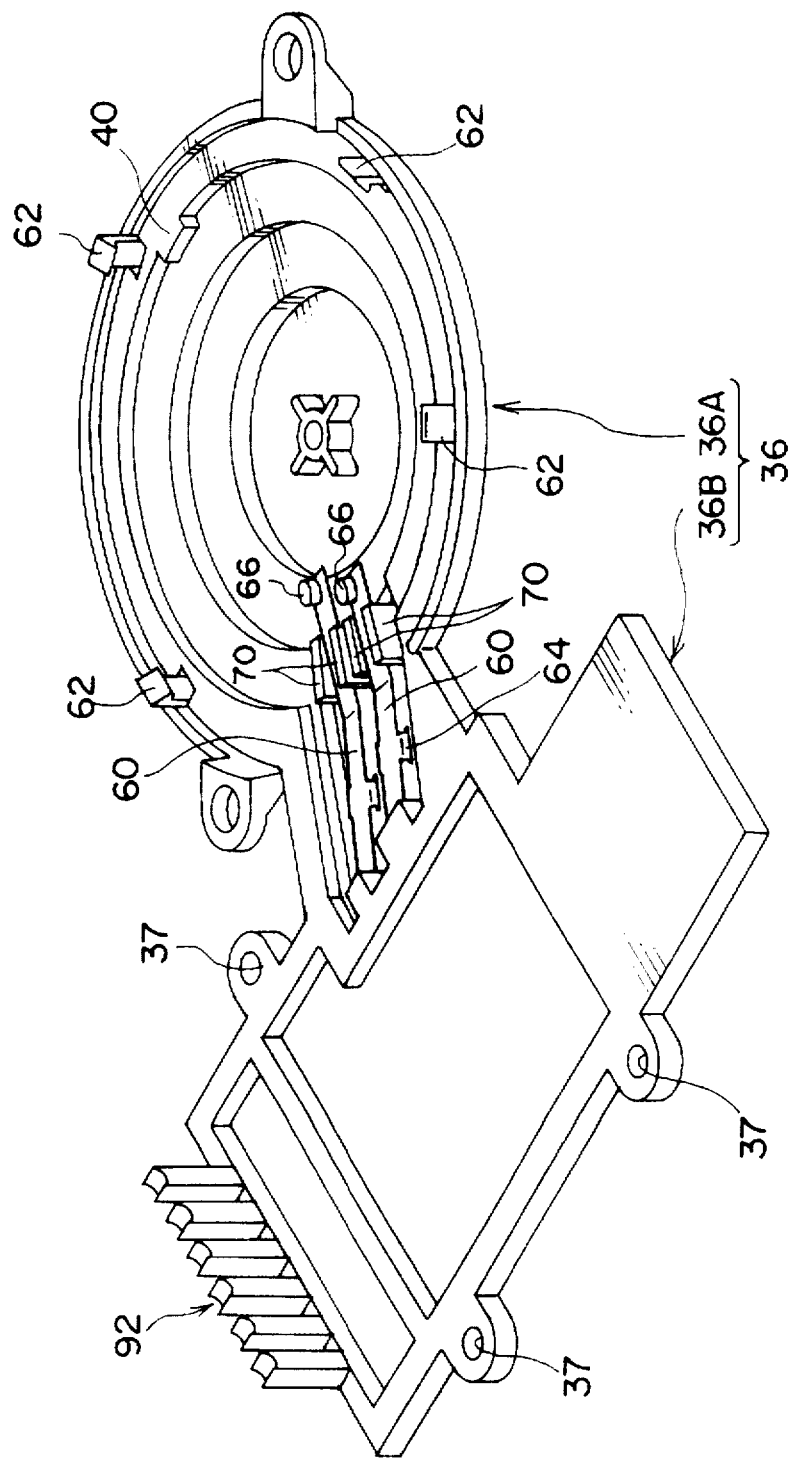
FIG. 4 is a perspective view of a cover plate of the position detecting device in accordance with the embodiment of the present invention.
Figure 5:
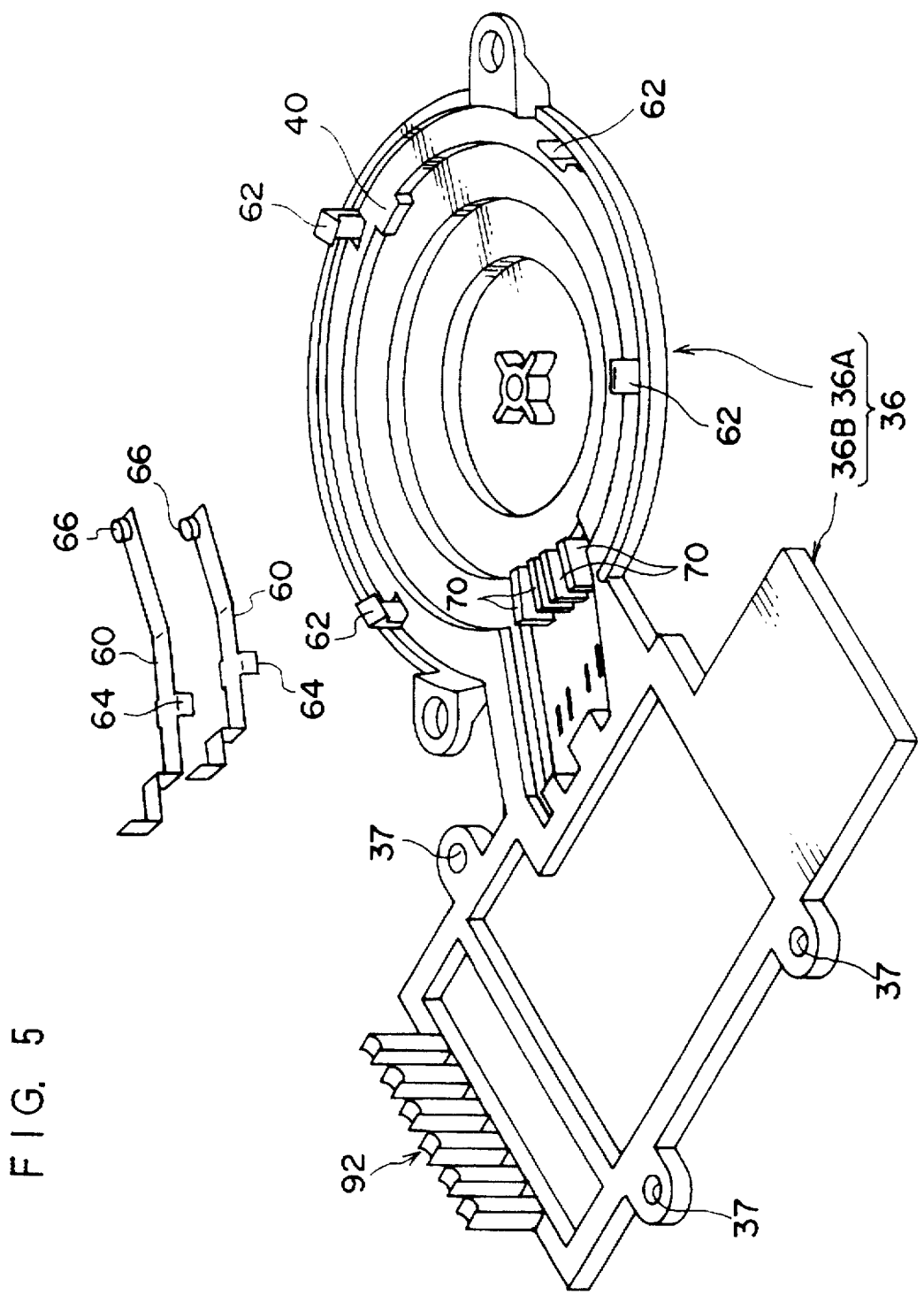
FIG. 5 is a perspective view of the cover plate of the position detecting device in accordance with the embodiment of the present invention.
Figure 6:
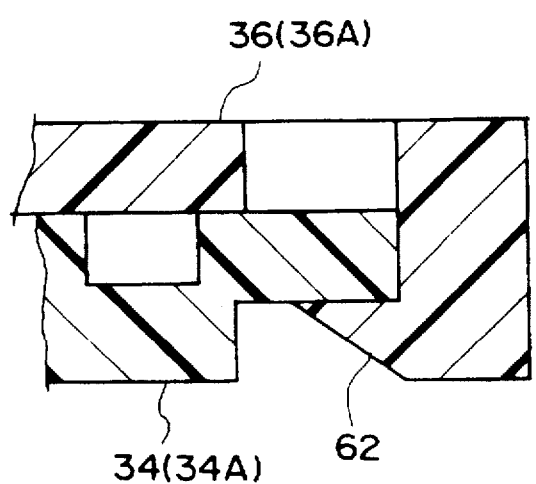
FIG. 6 is a cross-sectional view illustrating a retaining pawl of the cover plate of the position detecting device in accordance with the embodiment of the present invention.

As shown in detail in FIG. 1, the position detecting device 30 has a base plate 34 and a cover plate 36 which constitute a case 31. The base plate 34 includes a disk-shaped switch-accommodating portion 34A and a box-shaped substrate-accommodating portion 34B formed integrally with the switch-accommodating portion 34A. Meanwhile, the cover plate 36 includes a first covering portion 36A corresponding to the switch-accommodating portion 34A and a second covering portion 36B corresponding to the substrate-accommodating portion 34B. The base plate 34 and the cover plate 36 are fixed in a mutually joined state by means of screws 39 or the like at joining holes 35 and 37. In addition, as shown in detail in FIGS. 4 to 6, retaining pawls 62 are formed at peripheral edge portions of a reverse surface of the first covering portion 36A of the cover plate 36 in correspondence with peripheral edge portions of the switch-accommodating portion 34A of the base plate 34. Consequently, as the retaining pawls 62 engage the peripheral edge portions of the switch-accommodating portion 34A, the cover plate 36 is integrally fixed to the base plate 34 in close contact therewith in a simple snapping operation.

The position detecting device 30 has a connecting shaft 42. The connecting shaft 42 has one end integrally connected to the moving member or shaft 20 of the rotating gear wheel 16, and constantly rotates integrally with the shaft 20. Another end of the connecting shaft 42 projects into the position detecting device 30 (the base plate 34 and the cover plate 36) through a through hole 38 formed in the base plate 34. Further, a sun gear 44, which forms a part of a planetary gear train, is provided in the vicinity of the other end of the connecting shaft 42, and meshes with three planetary gears 54 which will be described later.

A ring gear 46, which forms another part of the planetary gear train 41, is disposed on a side of the base plate 34, i.e., around the connecting shaft 42, in surrounding relationship to the sun gear 44. A flange 48 is formed integrally with an end of the ring gear 46 on the base plate 34 side thereof, and the flange 48 is rotatably accommodated in the base plate 34. Further, the flange 48 is provided with a contact plate 50. The contact plate 50 is an electrically conductive plate formed in an arcuate shape, and is secured to the flange 48 in such a manner as to be substantially flush with the surface of the flange 48. A stopper portion 52 is formed on a peripheral portion of the flange 48 in such a manner as to project radially outwardly therefrom. The stopper portion 52 corresponds to a projection 40 (see FIGS. 4 and 5) formed on the first covering portion 36A of the cover plate 36. The arrangement provided is such that when the ring gear 46 (the flange 48) has rotated in the forward direction (in the direction of arrow A in FIGS. 1 and 2), i.e., clockwise in FIG. 2, and has reached a predetermined rotational position, the stopper portion 52 abuts against the projection 40, thereby preventing further rotation of the ring gear 46 in the forward direction.

The three planetary gears 54 are arranged on an inner periphery of the ring gear 46 between the same and the sun gear 44. These planetary gears 54 are rotatably supported by a gear base 56. Three supporting shaft portions 57 are formed projectingly on the gear base 56, and the planetary gears 54 are respectively supported by the supporting shaft portions 57, and mesh with both the ring gear 46 and the sun gear 44. That is, the sun gear 44, the ring gear 46, and the planetary gear 54 constitute the planetary gear train which is capable of transmitting the rotation of the connecting shaft 42 (i.e., via the moving member or shaft 20) in reduced form. In a state in which, for example, the gear base 56 is held and the revolution of the planetary gears 54 is prevented, the rotation of the connecting shaft 42 (i.e., via the moving member or shaft 20) can be reduced in speed, and can be transmitted to the ring gear 46.

Here, in this embodiment, the reduction gear ratio of the planetary gear train 41 comprising the sun gear 44, the ring gear 46, and the planetary gears 54 is set to be 4:1, such that the ring gear 46 does not undergo one rotation or more while the window glass undergoes one stroke (while the sun gear 44 undergoes three to 3.5 revolutions). Namely, the numbers of these gears are set. Incidentally, the reduction gear ratio of the planetary gear train is not limited to 4:1, and can be set arbitrarily, as required.

A wave washer 58 constituting a clutch mechanism is disposed between the gear base 56 and the cover plate 36 covering the planetary gear train 41 comprising the sun gear 44, the ring gear 46, the planetary gears 54, and the gear base 56 arranged as described above. The wave washer 58 constantly presses the gear base 56 against the base plate 34. As a result, normally, the gear base 56 is held with the tips of the supporting shaft portions 57 abutting against the base plate 34, and is prevented from rotating, while the planetary gears 54 are held in a state in which their revolution is prevented. Meanwhile, in a state in which the stopper portion 52 of the flange 48 of the ring gear 46 abuts against the projection 40, and further rotation of the ring gear 46 in the forward direction A is thereby stopped, the forwardly rotating force of the sun gear 44 exceeding the pressing force (holding force) against the gear base 56 and the base plate 34 due to the wave washer 58 acts, so that the holding of the gear base 56 by the base plate 34 due to the wave washer 58 is canceled, thereby permitting the revolution of the planetary gears 54. That is, after the stopper portion 52 of the flange 46 abuts against the projection 40, the wave washer 58 is capable of interrupting the transmission of the forwardly rotating force from the sun gear 44 and thereby the shaft 20 to the ring gear 46. Accordingly, in the state in which the stopper portion 52 abuts against the projection 40, and the rotation of the ring gear 46 is thereby prevented, if the sun gear 44 (shaft 20) rotates in the forward direction (in the direction in which the ring gear 46 is rotated in the forward direction) A, only the planetary gears 54 revolve together with the gear base 56.

Figure 7:
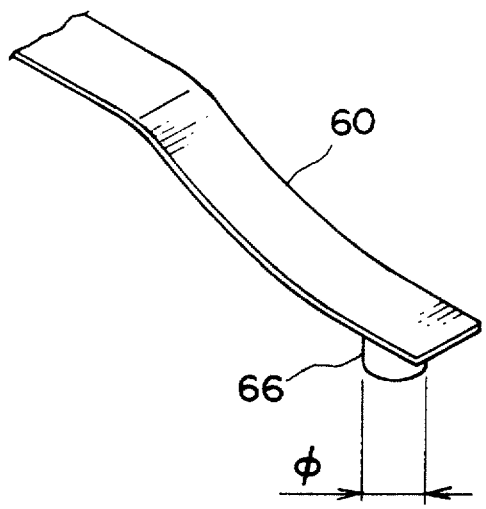
FIG. 7 is a perspective view illustrating a distal-end sliding contact of a contact terminal of the position detecting device in accordance with the embodiment of the present invention.

The cover plate 36 is provided with a pair of contact terminals 60. As shown in detail in FIGS. 4 and 5, each of the pair of contact terminals 60 is formed as a resilient contact plate, and a pressure-fitting projection 64 is formed in a longitudinally intermediate portion thereof. As the pressure-fitting projections 64 are pressure-fitted to the cover plate 36, the contact terminals 60 are secured to the cover plate 36. At the same time, a distal-end sliding contact 66 of each of the contact terminals 60 extends into the first covering portion 36A, i.e., toward the flange 48 of the ring gear 46, is resiliently brought into contact with the flange 48, and is brought into contact with the contact plate 50 at a predetermined rotational position of the ring gear 46. In addition, as shown in FIG. 7, since the distal-end sliding contact 66 of each of the contact terminals 60 is formed into a cylindrical shape having a diameter Φ, the distal-end sliding contact 66 is brought into planar contact with the contact plate 50.

Figure 8:
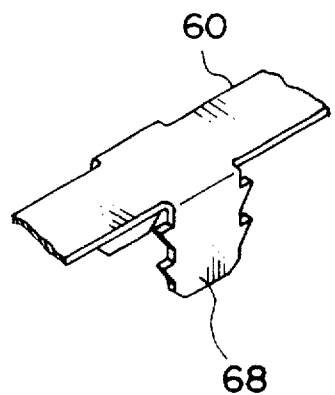
FIG. 8 is a perspective view illustrating another example of a pressure-fitting projection of the contact terminal of the position detecting device in accordance with the embodiment of the present invention.

Incidentally, side portions of each pressure-fitting projection 64 may be formed in a serrated form as in the case of a pressure-fitting projection 68 shown in FIG. 8. According to such pressure-fitting projections 68, the contact terminals 60 can be secured more reliably.

Figure 11A:
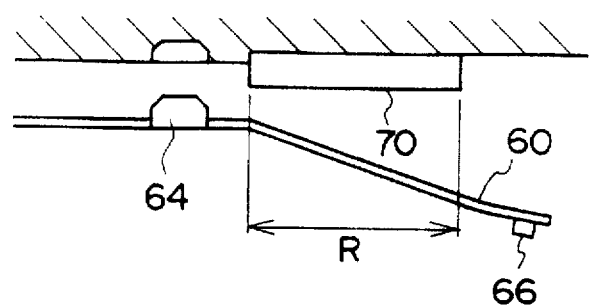
FIGS. 11A, 11B, and 11C are side elevational views illustrating an assembled state of the contact terminal of the position detecting device in accordance with the embodiment of the present invention.
Figure 11B:
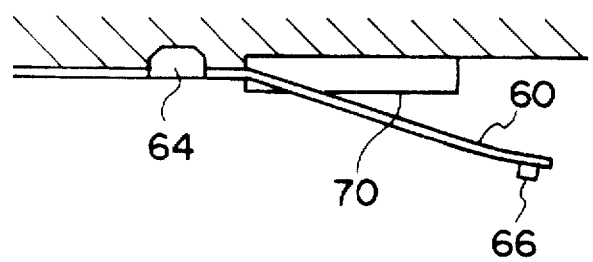
Figure 11C:
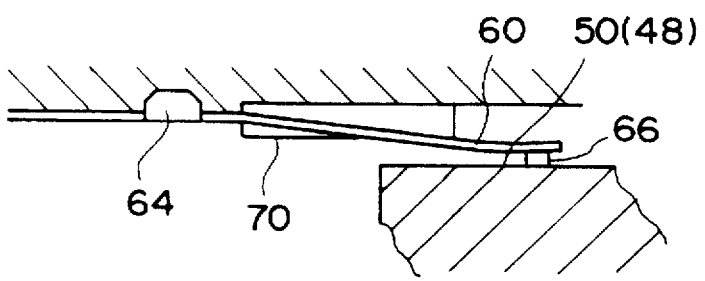

In addition, each of these contact terminals 60 is held by a pair of guide walls 70 formed on the cover plate 36. As shown in FIGS. 9 and 10, the pair of guide walls 70 are provided with rectangular cross sections and are integrally formed on the cover plate 36 in a projecting manner and in parallel to each other. Each of the contact terminals 60 is held between the pair of guide walls 70 by movably entering the space between the pair of guide walls 70. Consequently, the positional offset of each of the contact terminals 60 is prevented. Further, in this case, as shown in FIGS. 11A to 11C, the guide walls 70 are provided at a portion (i.e., in a range R in FIG. 11A) where the guide walls 70 engage a resiliently deformable portion of each contact terminal 60 in a natural state of each contact terminal 60 secured to the cover plate 36. Accordingly, in the state in which each contact terminal 60 is secured to the cover plate 36 (in the state in which it is set in the cover plate 36), i.e., in the natural state in which the contact terminal 60 is not resiliently deformed, the guide walls 70 already correspond to transversely opposite ends of the contact terminal 60 (resiliently deformable portion), and are therefore capable of guiding the contact terminal 60.

Figure 12:
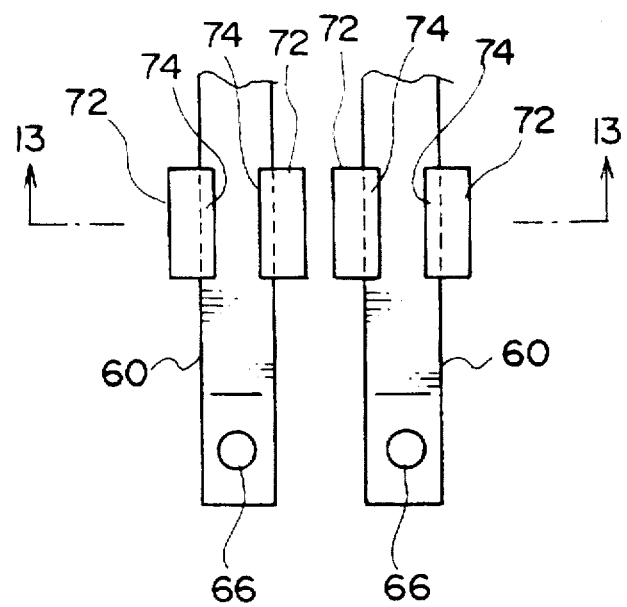
FIG. 12 is a plan view illustrating another example of the guide walls of the position detecting device in accordance with the embodiment of the present invention.
Figure 13:
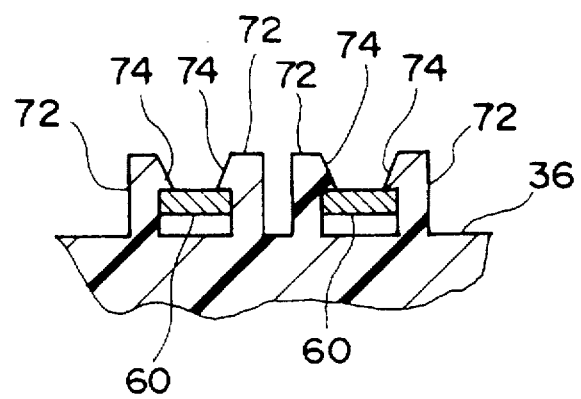
FIG. 13 is a cross-sectional view taken along line 13—13 in FIG. 12.
Figure 14:
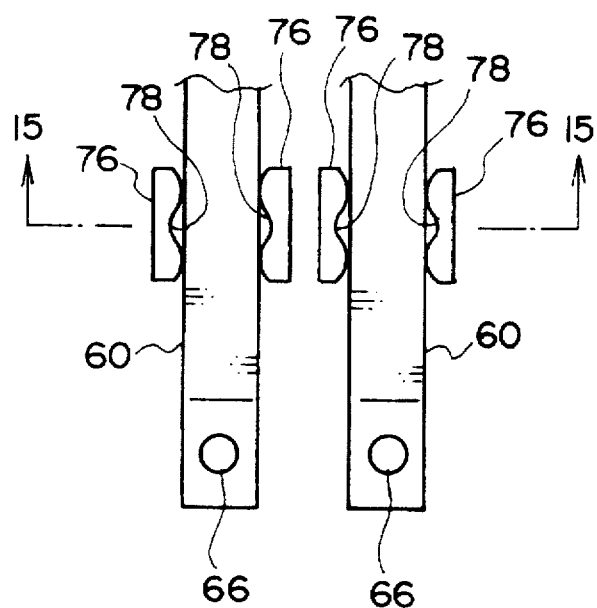
FIG. 14 is a plan view illustrating still another example of the guide walls of the position detecting device in accordance with the embodiment of the present invention.
Figure 15:
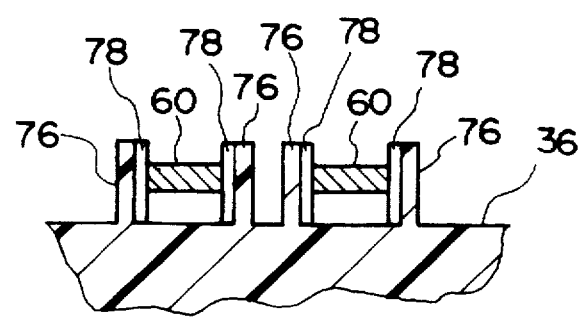
FIG. 15 is a cross-sectional view taken along line 15—15 in FIG. 14.

Incidentally, the guide wall 70 is not necessarily formed with the rectangular cross section as described above, and an arrangement may be provided such that a pawl 74 is provided at an upper end of a guide wall 72, as shown in FIGS. 12 and 13. In this case, it is possible to prevent the positional offset of the contact terminal 60 in the vertical direction as well (in the direction in which the contact terminal 60 moves toward or away from the cover plate 36). Still alternatively, an arrangement may be provided such that a recess 78 is provided in a longitudinally intermediate portion of a guide wall 76, as shown in FIGS. 14 and 15. In this case, the contact area (in other words, frictional resistance) of the guide wall with respect to the contact terminal 60 is reduced, so that the contact terminal 60 is liable to be resiliently deformed smoothly.

Figure 16:
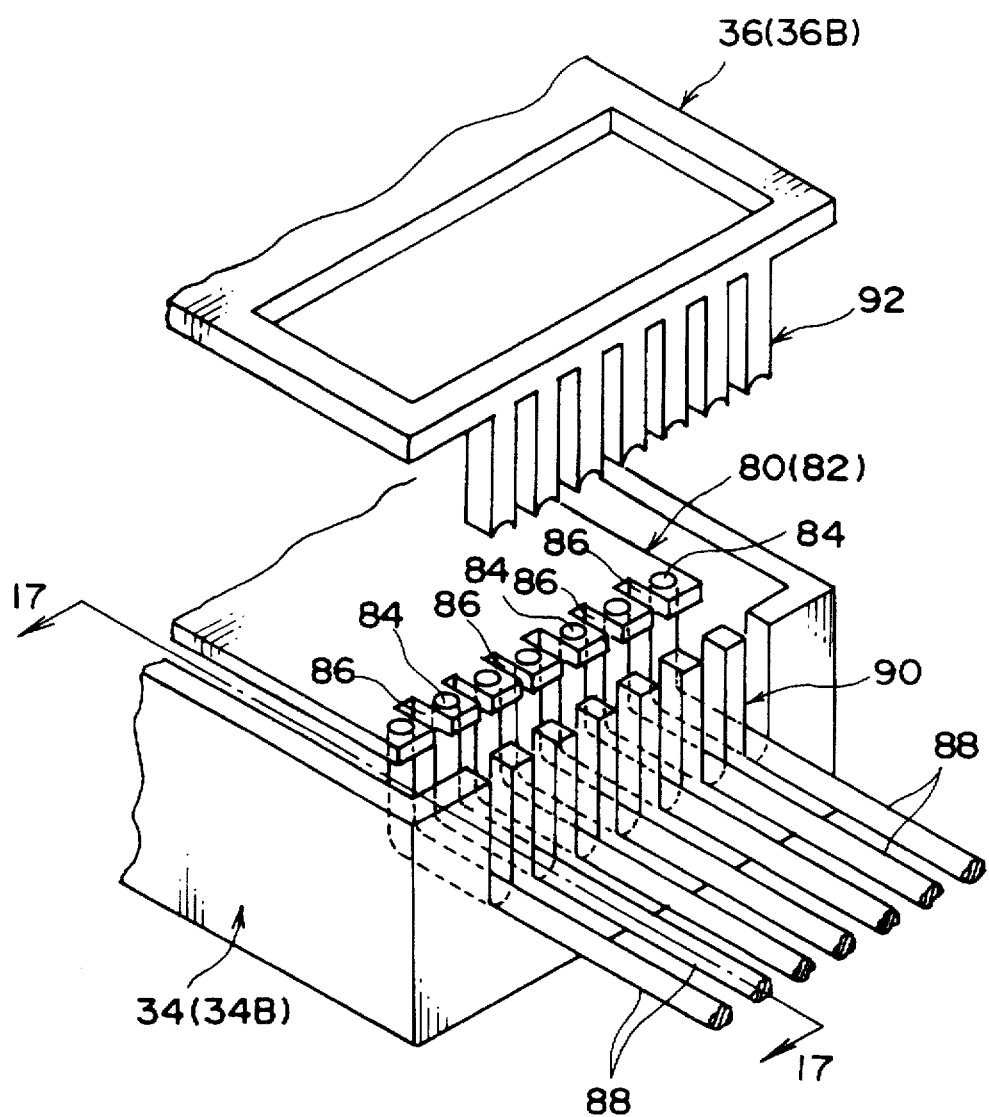
FIG. 16 is a perspective view illustrating passing/nipping portions formed in a base plate and the cover plate of the position detecting device in accordance with the embodiment of the present invention.
Figure 17:
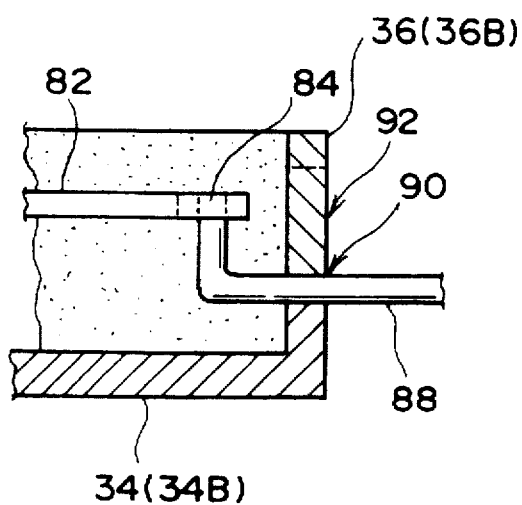
FIG. 17 is a cross-sectional view illustrating the passing/nipping portions formed in the base plate and the cover plate of the position detecting device in accordance with the embodiment of the present invention.
Figure 18A:
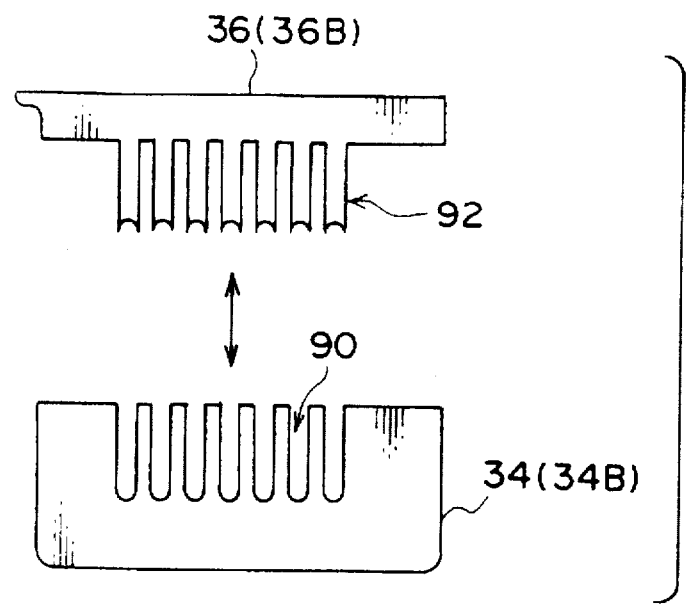
FIGS. 18A and 18B are side elevational views illustrating the passing/nipping portions formed in the base plate and the cover plate of the position detecting device in accordance with the embodiment of the present invention.
Figure 18B:
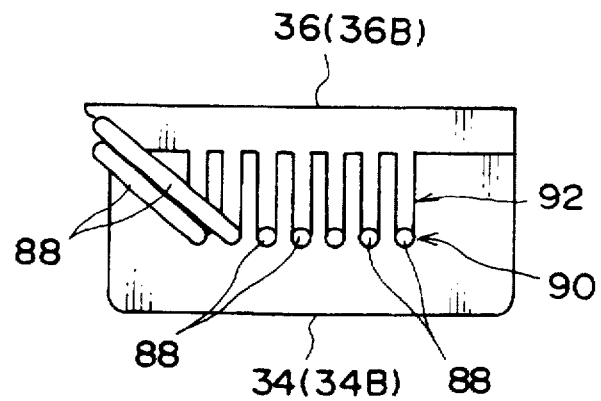

The contact terminals 60 secured to the cover plate 36 as described above are connected to a control circuit 80. The control circuit 80 is configured such that a plurality of electric parts are mounted on a substrate 82, and is formed in a box shape as a whole. The control circuit 80 is accommodated in the substrate-accommodating portion 34B of the base plate 34. In addition, a plurality of soldered connection portions 84 are provided at one end of the substrate 82 and adjacent to each other, as also shown in FIG. 16. Slits 86 are each formed between adjacent ones of the soldered connection portions 84 to space apart the soldered connection portions 84 independent of each other. Lead wires 88 are respectively connected to the soldered connection portions 84 by means of solder.

The lead wires 88 connected to the control circuit 80 are respectively led to the outside and to an external device through passing/nipping portions 90 formed in a comb shape in the base plate 34. That is, as shown in FIGS. 16, 17, 18A, and 18B, the passing/nipping portions 90 respectively corresponding to the lead wires 88 are formed in a side wall of the substrate-accommodating portion 34B of the base plate 34, while comb-shaped fitting portions (corresponding passing/nipping portions) 92, which correspond to the passing/nipping portions 90 and are adapted to fit in the same in an interdigitated manner, are formed in the second covering portion 36B of the cover plate 36. The lead wires 88 are respectively passed through the passing/nipping portions 90, and the fitting portions 92 are further fitted in the passing/nipping portions 90 so as to nip the lead wires 88 in close contact therewith and to lead the lead wires 88 to the an external device.

Figure 19A:
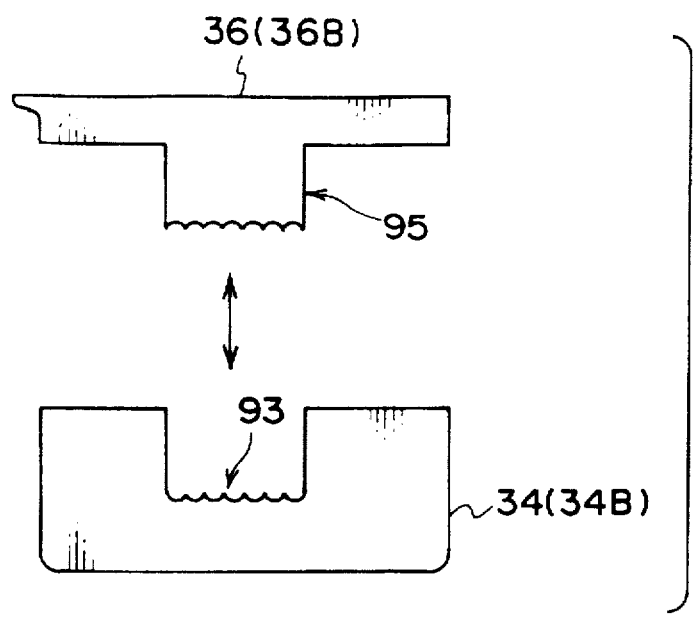
FIGS. 19A and 19B are side elevational views illustrating another example of the passing/nipping portions formed in the base plate and the cover plate of the position detecting device in accordance with the embodiment of the present invention.
Figure 19B:
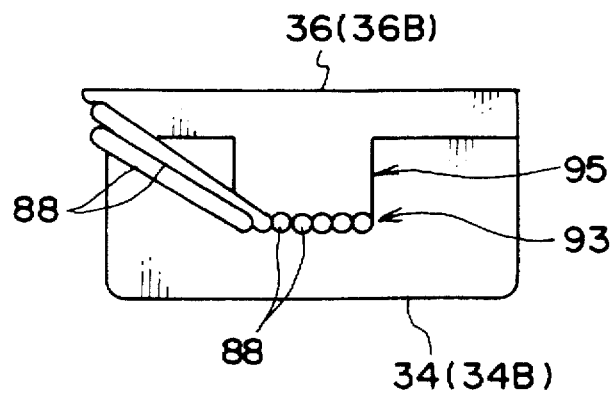

Incidentally, the passing/nipping portions 90 and the fitting portions 92 may not necessarily be formed in the comb shape as described above. For example, an arrangement may be provided such that, as in the case of a passing/nipping portion 93 and a fitting portion (a corresponding passing/nipping portion) 95 shown in FIGS. 19A and 19B, only those portions for nipping the lead wires 88 in close contact therewith are formed with a series of concave portions, and the lead wires 88 are put together horizontally and held in parallel.

An insulating resin material, such as a hot melt, is filled in an interior portion of the substrate-accommodating portion 34B accommodating the lead wires 88 (the soldered connection portions 84 and the slits 86 of the substrate 82 and their vicinities), thereby coating and fixing the soldered connection portions 84 and their vicinities.

Figure 20:
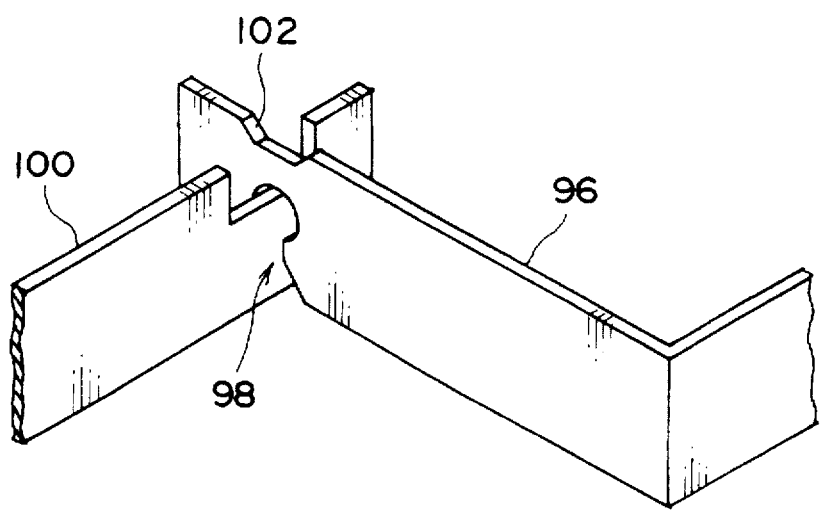
FIG. 20 is a perspective view illustrating a press-in contact portion provided in a power-supplying terminal of the position detecting device in accordance with the embodiment of the present invention.
Figure 21:
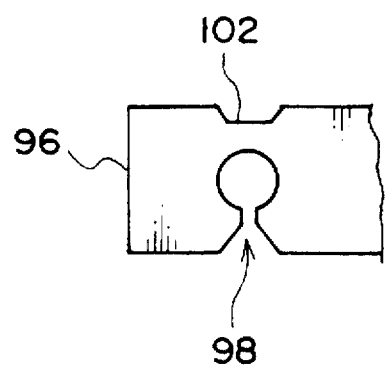
FIG. 21 is a front elevational view illustrating the press-in contact portion provided in the power-supplying terminal of the position detecting device in accordance with the embodiment of the present invention.

Meanwhile, a pair of pressure-fitted connection portions 94 are provided at the other end of the substrate 82 (the end which is away from the end where the soldered connection portions 84 are provided), as shown in FIG. 2. Further, a pair of power-supplying terminals 96 for the motor 10 (motor section 10A) are respectively pressure-fitted in and solder-connected to the pressure-fitted connection portions 94. As shown in detail in FIGS. 20 and 21, a distal end portion of the power-supplying terminal 96 is notched in a substantially fungiform shape, and a pressing contact portion 98 is thereby formed. A motor terminal 100 is pressure-fitted in this press-in contact portion 98 to make connection. A solder groove 102 is formed at an upper end of the power-supplying terminal 96 in the vicinity of the press-in contact portion 98. In a state in which the motor terminal 100 is pressure-fitted in the press-in contact portion 98, solder is allowed to flow from the solder groove 102 so as to fix the two members.

Figure 22:
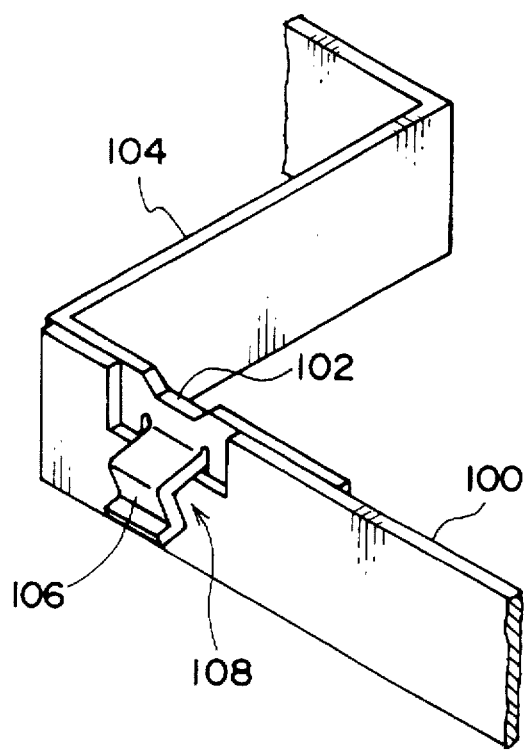
FIG. 22 is a perspective view illustrating another example of the press-in contact portion provided in the power-supplying terminal of the position detecting device in accordance with the embodiment of the present invention.

Incidentally, the press-in contact portion 98 is not necessarily formed in the above-described shape. For instance, an arrangement may be provided such that as in the case of a power-supplying terminal 104 shown in FIG. 22, a portion of the power-supplying terminal 104 is cut out to form a tongue 106, which is then bent to form a press-in contact portion 108, and the motor terminal 100 is pressure-fitted to and nipped by the press-in contact portion 108 (tongue 106) to make connection.

Since the contact plate 50 is energized by coming into contact with both the pair of contact terminals 60, the control circuit 80 having the above-described arrangement is capable of detecting the rotational position of the ring gear 46, i.e., the rotational position of the sun gear 44, i.e., the rotational position of the moving member or shaft 20. Hence, the control circuit 80 by its connection to an external device is capable of effecting the control of rotation of the motor 10 which will be described later.

In this embodiment, as shown in detail in FIG. 23, dimensions and the like of various parts are set such that at a point of time when the window glass has reached a position spaced apart 4 mm downward from an upper-end stop position, the stopper portion 52 reaches a position located at a rotational angle of α degrees upstream of a position where the stopper portion 52 abuts against the projection 40, and such that at this point of time the contact plate 50 is brought into contact with both the pair of contact terminals 60 and is thereby energized, and this energized state (the state in which the contact plate 50 is in contact with both the pair of contact terminals 60) is maintained until the stopper portion 52 is subsequently brought into contact with the projection 40.

An arrangement may be provided such that, contrary to the above, a surface portion of the flange 48 opposing the contact terminals 60 and not corresponding to the contact plate 50 is covered with an electrically conductive metal, while a portion thereof corresponding to the contact plate 50 is made electrically nonconductive by being formed of a resin or the like. Hence, at the point of time when the window glass reaches the position spaced apart 4 mm downward from the upper-end stop position, and the stopper portion 52 reaches the position located at the rotational angle of α degrees upstream of the position where the stopper portion 52 abuts against the projection 40, the position detecting device is set in a de-energized state (i.e., is changed over from an on state to an off state), thereby effecting the detection of the position. Still further, after the position detecting device is set in the energized or de-energized state as described above, the energized or de-energized state need not necessarily be electrically maintained. That is, an arrangement may be provided such that the reaching of a predetermined rotational position is determined by detecting a trigger signal which is issued when the contact plate 50 is brought into contact with both the pair of contact terminals 60.

Next, a description will be given of the operation of this embodiment by citing an example in which an up switch of the power window apparatus is operated to raise the window glass.

In the motor 10 and the position detecting device 30 constructed as described above, when the up switch of the power window apparatus is operated, the motor 10 is actuated and the moving member or shaft 20 rotates, which in turns actuates the window regulator to raise the window glass in the up direction C (see FIG. 29).

During the normal operation (when the window glass is being raised), the gear base 56 is pressed and held by means of the wave washer 58, and the planetary gears 54 are prevented from revolving. Accordingly, as the moving member or shaft 20 rotates, the rotating force of the connecting shaft 42 (i.e., the sun gear 44) is reduced in speed by means of the planetary gears 54, and is transmitted to the ring gear 46, causing the ring gear 46 to rotate gradually in the forward direction A.

Next, a predetermined rotational position of the motor 10, i.e., whether or not the window glass has reached a predetermined position (the position spaced apart 4 mm downward from the upper-end stop position), is detected by the position detecting device 30.

That is, with the position detecting device 30, as the shaft 20 rotates, the rotating force of the connecting shaft 42 (i.e., the sun gear 44) is reduced in speed by means of the planetary gears 54, and is transmitted to the ring gear 46, causing the ring gear 46 to rotate gradually in the forward direction. However, unless the window glass has not reached the position spaced apart 4 mm downward from the upper-end stop position, the stopper portion 52 is substantially remote from the projection 40, and the contact plate 50 is spaced apart from the pair of contact terminals 60 (distal-end sliding contact 66) and is in a state of noncontact therewith. Consequently, the rotational position of the moving member or shaft 20 (the fact that the window glass has not reached the position spaced apart 4 mm downward from the upper-end stop position) is detected. In this case, a determination is made on the basis of a lock current or the like of the motor 10 as to whether or not a foreign object has been caught by the window glass while the operation of the motor 10 is being continued. If it is detected that a foreign object has been caught, the motor 10 is rotated in the reverse direction B to lower the window glass in the direction D.

On the other hand, when the window glass reaches the position spaced apart 4 mm downward from the upper-end stop position, as shown by the two-dotted dash lines in FIG. 23, the stopper portion 52 reaches the position located at the rotational angle of α degrees upstream of the position where the stopper portion 52 abuts against the projection 40. Further, at this point of time, the contact plate 50 comes into contact wit h both the pair of contact terminals 60 (distal-end sliding contact 66) and is set in the energized state. Consequently, the rotational position of t he shaft 20 (the fact that the window glass has reached the position spaced apart 4 mm downward from the upper-end stop position) is detected.

If the reaching of the shaft 20 of the moving member or motor 10 at the predetermined rotational position, i.e., the fact that the window glass has reached the predetermined position, is detected, the operation of the motor 10 is continued. At this time, the relative position of contact between the contact plate 50 and the pair of contact terminals 60 changes due t o the rotation of the ring gear 46, but the energized state (the state in which the contact plate 50 and the pair of contact terminals 60 are in contact with each other) is maintained.

Next, whether or not the window glass has been fully closed is determined on the basis of the lock current or the like of the motor 10. Upon detection of the fully closed state of the window glass, the motor 10 is stopped.

Thus, the position detecting device 30 is capable of detecting with high accuracy the rotational position of the moving member or shaft 20, i.e., the position of the window glass (whether or not the window glass has reached the position spaced apart 4 mm downward from the upper-end stop position) by means of the contact plate 50 rotating together with the ring gear 46 and the pair of contact terminals 60.

Here, with the position detecting device 30, if the moving member or shaft 20 of the motor 10 is temporarily rotated sufficiently in the forward direction A when the position detecting device 30 is installed in the vehicle body, the position detecting device 30 can be automatically set to an initial state in which the contact plate 50 is in contact with the contact terminals 60.

That is, if the moving member or shaft 20 of the motor 10 is temporarily rotated sufficiently in the forward direction A when the position detecting device 30 is installed in the vehicle body, the stopper portion 52 of the flange 48 of the ring gear 46 abuts against the projection 40, and further forward rotation of the ring gear 46 is prevented. In this state, if moving member or the shaft 20 is further rotated, the rotating force of the sun gear 44 which exceeds the pressing force (holding force) of the gear base 56 acts, so that the wave washer 58 cancels the holding by the gear base 56, thereby permitting the planetary gears 54 to revolve. Namely, after the stopper portion 52 of the flange 48 abuts against the projection 40, the wave washer 58 is capable of interrupting the transmission of the forward rotation in the forward direction A from the sun gear 44 via (shaft 20) to the ring gear 46. Hence, in the state in which the stopper portion 52 abuts against the projection 40 and the rotation of the ring gear 46 is prevented, if the sun gear 44 via (shaft 20) rotates in the forward direction A (in the direction in which the ring gear 46 is rotated in the forward direction), only the planetary gears 54 revolve. Accordingly, after the stopper portion 52 abuts against the projection 40 and the contact plate 50 is brought into contact with the contact terminals 60, even if the moving member or shaft 20 of the motor 10 is rotated in the forward direction, the ring gear 46 does not move, and the state of contact between the contact plate 50 and the contact terminals 60 is maintained. Namely, if the moving member or shaft 20 of the motor 10 is temporarily rotated sufficiently in the forward direction A, the position detecting device 30 is automatically set in the initial state in which the stopper portion 52 abuts against the projection 40 and the contact plate 50 is in contact with the contact terminals 60.

In other words, with the position detecting device 30, since the position spaced apart a predetermined distance (in this embodiment, 4 mm) from the fully closed position (an upper maximum limit of movement) of the window glass can be mechanically stored regardless of whether the window glass has reached the fully closed position (the upper maximum limit of movement) (since the position spaced apart 4 mm is used as a reference in detection), it is possible to reliably control the movement of the window glass without error). For example, in a conventional position detecting device arranged to detect the position of movement of the window glass by detecting the number of revolutions of the armature of the motor, the position detecting device is arranged to be reset so as to use the fully closed position of the window glass as a reference. However, in the event that the window glass has stopped without reaching its true upper maximum limit of movement for reasons such as a decline in the supply voltage, an increase in frictional contact between the window glass and a window frame, and the like, the position detecting device is reset by using this false stop position as the fully closed position of the window glass. Accordingly, in this case, since the driving of the motor is controlled by using the false fully closed position of the window glass, the error becomes very large. In contrast, with the position detecting device 30, even if the window glass is stopped without reaching its true fully closed position (upper maximum limit of movement), this fact is detected reliably at a point of time when the window glass subsequently passes the position spaced apart 4 mm from the true fully closed position. Hence, the movement of the window glass can be controlled reliably without error. In particular, in the case of a wire-type window regulator, the error in control of the position of movement is large due to the slackening of the wire. However, the error attributable to the slackening of the wire can be absorbed by using the position detecting device 30, and highly accurate control becomes possible.

Thus, with the position detecting device 30, by temporarily rotating the moving member or shaft 20 of the motor 10 sufficiently in the forward direction A during the installation of the position detecting device 30 in the vehicle body, the position detecting device 30 is automatically set in the initial state in which the stopper portion 52 abuts against the projection 40 and the contact plate 50 is in contact with the contact terminals 60. Hence, the setting of the initial position can be effected easily without involving the complicated adjustment of an installing position during installation and the complicated resetting after installation. Further, the control of movement of the window glass can be effected reliably without error.

With the position detecting device 30, the overall apparatus is made compact since the control circuit 80 for detecting the rotational position of the moving member or shaft 20 (the position of movement of the window glass) in association with the contact plate 50 and the contact terminals 60 is integrally accommodating in the substrate-accommodating portion 34B of the base plate 34. Accordingly, a large installation space for installing the position detecting device 30 is not required, and the installation work is also facilitated. Further, connection wires and the like which are conventionally used for connecting various parts are not required, thereby effecting a substantial reduction in cost.

With the position detecting device 30, the lead wires 88 of the control circuit 80 are nipped by the passing/nipping portions 90 provided in the base plate 34 and the fitting portions (corresponding passing/nipping portions) 92 and are led outside to connect with an external device. Further, since the passing/nipping portions 90 are formed in a comb shape in correspondence with the lead wires 88, and the lead wires 88 are nipped in close contact with the passing/nipping portions 90, when an insulating resin material is filled in the interior portion of the substrate-accommodating portion 34B accommodating the lead wires 88 (the soldered connection portions 84 and the slits 86 of the substrate 82 and their vicinities) to coat and fix the soldered connection portions 84 and their vicinities, the filled insulating resin material does not flow out of the base plate 34 and the cover plate 36. In addition, even in the event that an external force is applied to the lead wires 88, since the lead wires 88 are nipped in the passing/nipping portions 90 in close contact therewith, the external force is not transmitted to the soldered connection portions 84, thereby preventing the faulty connection of the soldered connection portions 84. Furthermore, since the slits 86 are respectively formed between adjacent ones of the soldered connection portions 84 to space apart the soldered connection portions 84 independent of each other, when the insulating resin material is filled in the substrate-accommodating portion 34, the fluidity of the insulating resin material over the soldered connection portions 84 and their vicinities improves. Hence, the soldered connection portions 84 are reliably insulated from each other.

With the position detecting device 30, since the retaining pawls 62 provided on the cover plate 36 engage the peripheral edge portions of the switch-accommodating portion 34A of the base plate 34, the cover plate 36 is integrally fixed to the base plate 34 in close contact therewith in a simple snapping operation. Accordingly, the assembling operation improves substantially. Further, if the retaining pawls 62 are provided at a plurality of portions, the cover plate 36 and the base plate 34 can be fixed to each other more reliably, and the sealing characteristic also improves.

With the position detecting device 30, each of the contact terminals 60 accommodated in the switch-accommodating portion 34A of the base plate 34 is supported with its one end directly fixed to the cover plate 36. As the contact terminals 60 are thus fixed, the contact terminals 60 are set in a state of being covered by the cover plate 36 (first covering portion 36A). Accordingly, it is possible to reduce the possibility of the contact terminals 60 being unnecessarily brought into contact with other members or becoming positionally offset during the assembling and transit of the component parts, and the contact terminals 60 can be fixed reliably in a predetermined position.

With the position detecting device 30, as for the contact terminals 60 which are supported by being directly fixed to the cover plate 36, their transversely opposite ends are guided by the guide walls 70 provided integrally on the cover plate 36. Accordingly, even in a case where the overall length of each of the contact terminals 60 is formed to be long, the contact terminals 60 are prevented from being swayed unnecessarily and becoming positionally offset, and the detection accuracy of the contact terminals 60 is prevented from declining.

With the position detecting device 30, in the state in which the contact terminals 60 are secured to the cover plate 36 (in the state in which the contact terminals 60 are set on the cover plate 36), i.e., in the natural state in which the contact terminals 60 have not been resiliently deformed, the guide walls 70 correspond to the transversely opposite ends of each contact terminal 60, and are capable of guiding the same, as shown in FIG. 11B. Accordingly, as shown in FIG. 11C, when the contact terminals 60 are subsequently assembled together with the cover plate 36 (when the distal-end sliding contact 66 of each of the contact terminals 60 is brought into resilient contact with the flange 48), it is possible to prevent a situation in which the contact terminals 60 are unnecessarily engaged with the guide walls 70 to prize the contact terminals 60, so that the contact terminals 60 can be assembled reliably in a predetermined position.

With the position detecting device 30, the distal-end sliding contact 66 of each of the contact terminals 60 is formed into a cylindrical shape having a diameter $\phi$, and the distal-end sliding contact 66 is brought into planar contact with the flange 48 (contact plate 50). Therefore, even if the distal-end sliding contact 66 of each of the contact terminals 60 is worn due to sliding over long periods of time, the initial state of contact is maintained, so that the detection accuracy of the contact terminals 60 does not decline.

Accordingly, if the arrangement provided is such that a pulse signal is detected by the contact terminals 60 having the aforementioned cylindrical distal-end sliding contacts 66, the duty of the pulse signal can be advantageously maintained reliably at a fixed level.

Figure 25:
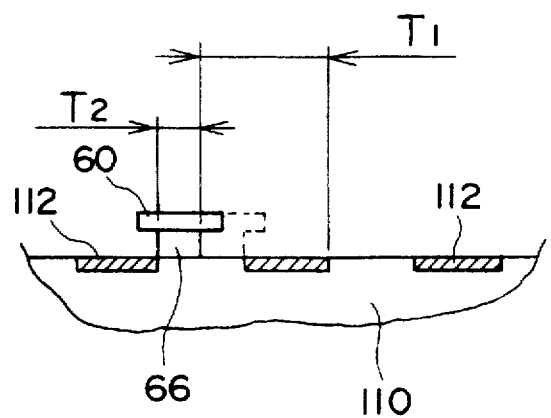
FIG. 25 is a side elevational view illustrating the relationship of correspondence between the contact terminals and a pulse plate of the position detecting device in accordance with the embodiment of the present invention.
Figure 26:
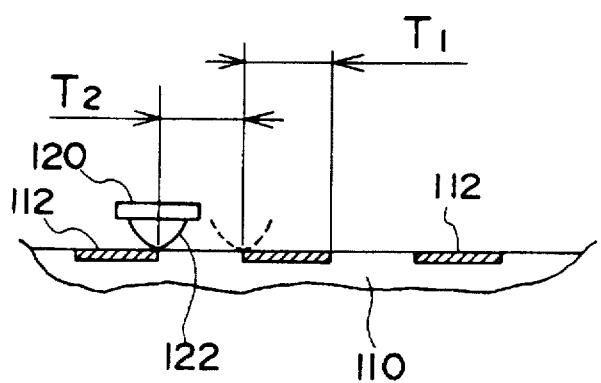
FIG. 26 is a side elevational view illustrating the relationship of correspondence between a conventional contact terminal and the pulse plate, and corresponds to FIG. 25.
Figure 27:
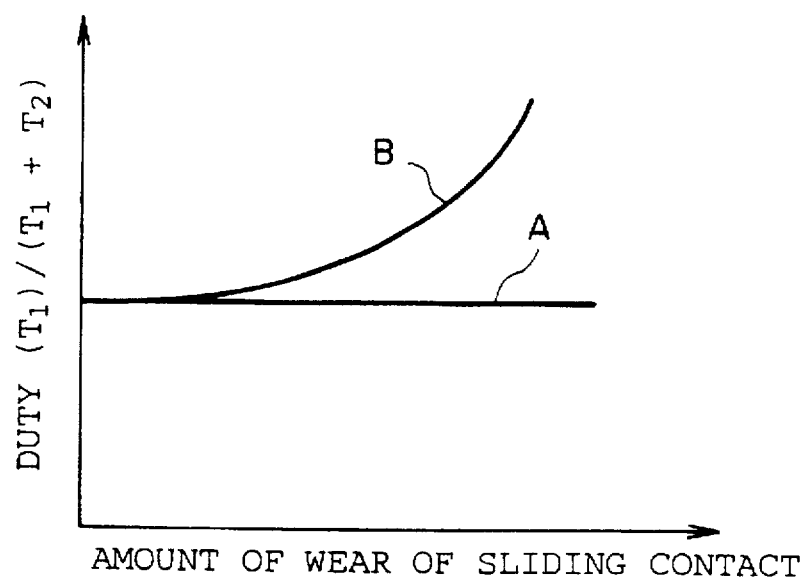
FIG. 27 is a diagram illustrating a difference in the change of a duty between the contact terminal of the position detecting device in accordance with the embodiment of the present invention and a conventional contact terminal.
Figure 28:
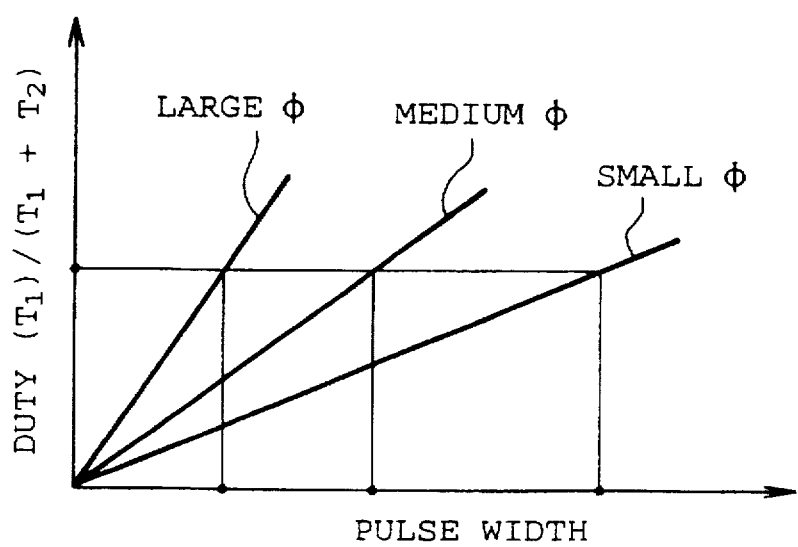
FIG. 28 is a diagram illustrating the relationship between the duty of a pulse signal to be set and the diameter of the distal-end sliding contact of the contact terminal of the position detecting device in accordance with the embodiment of the present invention.

For example, as shown in FIGS. 24 and 25, in a case where a pulse plate 110 having an electrically conductive portion 112 with pulse-like projections arranged in a continuous form is used as a pulse-generating means, and the distal-end sliding contacts 66 of the contact terminals 60 are brought into sliding contact with the electrically conductive portion 112 of the pulse plate 110, as the pulse plate 110 rotates, the distal-end sliding contacts 66 repeatedly undergo contact and noncontact with the electrically conductive portion 112, thereby making it possible to detect a pulse signal of a duty $(T_1)/(T_1+T_2)$. In this case, in the case of a contact terminal 120 having a distal-end sliding contact 122 having a mere spherical outer configuration as shown in FIG. 26, the state of contact with the electrically conductive portion 112 gradually changes due to wear. As a result, the duty $(T_1)/(T_1+T_2)$ of the pulse signal undergoes a change, as indicated by line B in FIG. 27. In contrast, in the case of the contact terminal 60 having the cylindrical distal-end sliding contact 66, even if the distal-end sliding contact 66 is worn due to sliding over long periods of time, the initial state of contact with the electrically conductive portion 112 can be maintained. Hence, the duty $(T_1)/(T_1+T_2)$ of the pulse signal can be maintained reliably at a fixed level, as indicated by line A in FIG. 27. Accordingly, the detection accuracy of the contact terminals 60 does not decline.

Incidentally, in the case where the aforementioned cylindrical distal-end sliding contacts 66 are used, the predetermined duty of the pulse signal to be set is determined by the diameter $\phi$ of the distal-end sliding contact 66 and the pulse width (in other words, the width of the pulse-like projection of the electrically conductive portion 112 and an interval between adjacent ones of the pulse-like projections). Thus, it is possible to determine various dimensions in accordance with a desired duty.

With the position detecting device 30, the press-in contact portion 98 is provided in each of the power-supplying terminals 96 connected to the control circuit 80. Since the press-in contact portion 98 is connected to the motor terminal 100 by pressure fitting, if the control circuit (substrate 82) is accommodated in the substrate-accommodating portion 34B of the base plate 34, the power-supplying terminal 96 and the motor terminal 100 can be automatically pressure-fitted to each other. Thus the assembling efficiency improves. Further, since the press-in contact portion 98 is secured as solder is allowed to flow to that portion through the solder groove 102, the influx efficiency of solder improves, with the result that the power-supplying terminal 96 can be easily and reliably connected and secured.

Although in the above-described embodiment a description has been given of an example in which the position detecting device 30 is used directly for the motor 10 of a power window apparatus, the application of the position detecting device 30 is not limited to such direct application to the motor 10, and the position detecting device 30 may naturally be applied to other mechanisms or portions. For instance, the position detecting device 30 may be provided on an arm-pivotally-supporting shaft of a window regulator apparatus of an X-arm type, or may be provided on a wire-winding pulley of a wire-type window regulator apparatus. In each of these cases, the position of the window glass can be detected with high accuracy, and the movement of the window glass can be controlled with high accuracy. Moreover, the setting of the initial position can be effected easily without involving the complicated adjustment of an installing position during installation and the complicated resetting after installation.

Furthermore, in the above-described embodiment, a description has been given of the position detecting device 30 in which control is effected by detecting the rotational position of the output shaft (shaft 20) of the motor 10 for the power window apparatus. However, the present invention is not limited to the same, and is also applicable to a case where control is effected by detecting the position of movement of a moving member (e.g., a sun roof which moves on guide rails) which linearly reciprocates between two positions or directions, such as directions C and D of a window glass (See FIG. 29).

What is claimed is:

1. A device for detecting the position of a moving member for detecting a predetermined position of movement of a moving member which moves in a forward direction and a reverse direction, said device comprising:

a case including a cover plate and a base plate;

a switch accommodating portion integrally formed in said case and having at least one pair of resilient contact terminals which are turned on and off;

a planetary gear train having a ring gear and a planetary gear which are accommodated in said case, said planetary gear train being operatively connected to receive a moving force transmitted from said moving member, said ring gear having means for turning on or off said switch portion when said moving member is located at the predetermined position;

a clutch mechanism accommodated in said case and having means for transmitting the moving force of said moving member from said planetary gear to said ring gear by preventing the revolution of said planetary gear to rotate said ring gear, said clutch mechanism further having means for interrupting the transmission of a rotating force in the forward direction from said moving member to said ring gear by permitting the revolution of said planetary gear in a state in which said switch portion is turned on or off;

a control circuit accommodated in said case and connected to said switch portion so as to detect the predetermined position of movement of said moving member as said switch portion is turned on or off;

lead wires operatively positioned to connect said control circuit with an external device disposed outside of said case, a first end of said lead wires connected to said control circuit being accommodated in an interior portion of said case; and an insulating resin material filled in said interior portion of said case.

2. A device for detecting the position of a moving member according to claim 1, wherein said case includes passing and fitting portions each having a series of concave and convex porticos for nipping said lead wires in close contact therewith.

3. A device for detecting the position of a moving member according to claim 2, wherein one end of each of said at least one pair of contact terminals of said switch portion is directly fixed to said case.

4. A device for detecting the position of a moving member according to claim 2, wherein a cylindrical portion is provided on a distal-end sliding portion of each of said contact terminals of said switch portion, and said cylindrical portion is brought into planar contact with a corresponding contact.

5. A device for detecting the position of a moving member according to claim 2, wherein a press-in contact portion which is pressure-fitted to another corresponding terminal is provided at a distal-end connecting portion of a power-supplying connection terminal connected to said control circuit, and a groove for soldered connection is provided in a vicinity of said press-in contact portion.

6. A device for detecting the position of a moving member according to claim 1, wherein a retaining pawl which engages said base plate is provided on said cover plate, and said cover plate and said base plate are fixed to each other by means of said retaining pawl.

7. A device for detecting the position of a moving member according to claim 6, wherein one end of each of said at least one pair of contact terminals of said switch portion is directly fixed to said case.

8. A device for detecting the position of a moving member according to claim 1, wherein one end of each of said at least one pair of contact terminals of said switch portion is supported by being directly fixed to said case.

9. A device for detecting the position of a moving member according to claim 8, wherein each of said contact terminals is formed in a plate-shape, and guide walls respectively positioned in correspondence with transversely opposite ends of each of said contact terminals to prevent the positional offset of each said contact terminal in a transverse direction thereof are provided on said case.

10. A device for detecting the position of a moving member according to claim 9, wherein said guide walls are respectively provided at positions corresponding to the transversely opposite ends of each said contact terminal.

11. A device for detecting the position of a moving member according to claim 1, wherein a cylindrical portion is provided on a distal-end sliding portion of each of said contact terminals of said switch portion, and said cylindrical portion is brought into planar contact with a corresponding contact.

12. A device for detecting the position of a moving member according to claim 1, wherein a press-in contact portion which is pressure-fitted to another corresponding terminal is provided at a distal-end connecting portion of a power-supplying connection terminal connected to said control circuit, and a groove for soldered connection is provided in a vicinity of said press-in contact portion.

13. A device for detecting the position of a rotating member for detecting a predetermined position of movement of a reciprocating member which moves in a third direction by means of the rotation in a first direction of said rotating member which moves in the first direction and in a second direction opposite to the first direction, and which moves in a fourth direction opposite to the third direction by means of the rotation in the second direction of said rotating member, said device comprising:

a case including a cover plate and a base plate;

a switch accommodating portion integrally formed in said case and having at least one pair of resilient contact terminals which are turned on and off;

a planetary gear train having a ring gear and a planetary gear which are accommodated in said case, said planetary gear train being operatively connected to receive a rotating force transmitted from said rotating member, said ring gear having means for turning on or off said switch portion when said moving member is located at the predetermined position;

a clutch mechanism which is accommodated integrally in said case and is normally adapted to transmit having means for transmitting the rotating force of said rotating member from said planetary gear to said ring gear by preventing the revolution of said planetary gear to rotate said ring gear, said clutch mechanism further having means for interrupting the transmission of the rotating force in the first direction from said rotating member to said ring gear by permitting the revolution of said planetary gear in a state in which said switch portion is turned on or off;

a control circuit accommodated in said case and connected to said switch portion so as to detect the predetermined position of movement of said rotating member as said switch portion is turned on or off;

lead wires operatively positioned to connect said control circuit with an external device disposed outside of said case, a first end of said lead wires connected to said control circuit being accommodated in an interior portion of said case; and an insulating resin material filled in said interior portion of said case.

14. A device for detecting the position of a rotating member according to claim 13, wherein said case includes passing and fitting portions each having a series of concave and convex portions for nipping said lead wires in close contact therewith.

15. A device for detecting the position of a rotating member according to claim 13, wherein a retaining pawl which engages said base plate is provided on said cover plate, and said cover plate and said base plate are fixed to each other by means of said retaining pawl.

16. A device for detecting the position of a rotating member according to claim 13, wherein one end of each of said at least one pair of contact terminals of said switch portion is directly fixed to said case.

17. A device for detecting the position of a rotating member according to claim 16, wherein each of said contact terminals is formed in a plate-shape, and a pair of guide walls respectively positioned in correspondence with transversely opposite ends of each of said contact terminals to prevent the positional offset of said contact terminal in a transverse direction thereof are provided on said case.

18. A device for detecting the position of a rotating member according to claim 17, wherein said guide walls are respectively provided at positions corresponding to the transversely opposite ends of each said contact terminal.

19. A device for detecting the position of a rotating member according to claim 13, wherein a cylindrical portion is provided on a distal-end sliding portion of each of said contact terminals of said switch portion, and said cylindrical portion is brought into planar contact with a corresponding contact.

20. A device for detecting the position of a rotating member according to claim 13, wherein a press-in contact portion which is pressure-fitted to another corresponding terminal is provided at a distal-end connecting portion of a power-supplying connection terminal connected to said control circuit, and a groove for soldered connection is provided in a vicinity of said press-in contact portion.

21. A motor device having a position detecting device for a window glass which detects a predetermined position of movement of the window glass which moves in a forward direction and a reverse direction, said motor device comprising:

a housing including a base plate and a cover plate;

a speed reducing portion accommodated in said housing, said speed reducing portion having means for reducing a rotational speed of a motor and for transmitting driving force to said window glass;

a sensor portion for sensing the driving force from said speed reducing portion transmitted via a driving shaft, said sensor portion having means for generating a signal when the window glass reaches the predetermined position of movement; and a control circuit for detecting that the window glass has reached the predetermined position of movement based on the signal generated by said sensor portion, wherein said base plate has a hole for receiving said driving shaft, said cover plate covers said base plate, said sensor plate and said control circuit are accommodated between said base plate and said cover plate, and an opening of said housing is covered by said base plate.

22. A motor device according to claim 21, wherein said control circuit is disposed at a driving shaft radial direction outer side of said sensor portion.

23. A motor device according to claim 21, further comprising:

lead wires spaces from each other and respectively provided for connecting said control circuit to an external device disposed outside of said housing; and a lead wire holding structure for holding said lead wires in said housing.

24. A motor device according to claim 23, wherein said lead wire holding structure includes an upper nipping member provided on said cover plate and a lower nipping member provided on said base plate of said housing, each having a series of concave and convex portions for nipping said lead wires.

25. A motor device according to claim 23, further comprising:

an insulating resin material filled in an interior portion of said housing accommodating said lead wires.

* * * * *